(12) United States Patent
Yamada et al.

(10) Patent No.: US 12,635,737 B2
(45) Date of Patent: May 26, 2026

(54) AEROSOL GENERATING APPARATUS AND METHOD AND PROGRAM FOR ACTUATING THE SAME

(71) Applicant: JAPAN TOBACCO INC., Tokyo (JP)

(72) Inventors: Manabu Yamada, Tokyo (JP); Takeshi Akao, Tokyo (JP); Kazuma Mizuguchi, Tokyo (JP); Masayuki Tsuji, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 381 days.

(21) Appl. No.: 16/856,294

(22) Filed: Apr. 23, 2020

(65) Prior Publication Data

US 2020/0260793 A1 Aug. 20, 2020

Related U.S. Application Data

(63) Continuation of application No. PCT/JP2017/038312, filed on Oct. 24, 2017.

(51) Int. Cl.
*A24F 40/44* (2020.01)
*A24F 40/10* (2020.01)
(Continued)

(52) U.S. Cl.
CPC .............. *A24F 40/60* (2020.01); *A24F 40/42* (2020.01); *A24F 40/44* (2020.01); *A24F 40/53* (2020.01);
(Continued)

(58) Field of Classification Search
None
See application file for complete search history.

(56) References Cited

U.S. PATENT DOCUMENTS 8,539,959 B1 9/2013 Scatterday
9,675,114 B2 6/2017 Timmermans
(Continued)

FOREIGN PATENT DOCUMENTS

CN 204070551 U 1/2015
EP 2257195 B1 6/2012
(Continued)

OTHER PUBLICATIONS

Libretexts, "Viscosity and Laminar Flow; Poiseuille's Law," Accessed Jun. 13, 2023, https://phys.libretexts.org/. (Year: 2023).*
(Continued)

*Primary Examiner* — Philip Y Louie
*Assistant Examiner* — Sonny V Nguyen
(74) *Attorney, Agent, or Firm* — XSENSUS LLP

(57) ABSTRACT

An aerosol generating apparatus includes a load that generates heat upon receipt of electric power from a power supply and atomizes an aerosol source, an element that is used to acquire a value related to a temperature of the load, a fibrous or porous material that retains the aerosol source supplied from a container to allow the retained aerosol source to be in a feasible state of being heated by the load, and a controller configured to distinguish between a first state of the aerosol generating apparatus in which the aerosol source stored in the container is insufficient in quantity, and a second state in which the container is capable of supplying the aerosol source while the aerosol source retained by the fibrous or porous material is insufficient in quantity, on the basis of a change in the value related to the temperature of the load.

19 Claims, 18 Drawing Sheets
(3 of 18 Drawing Sheet(s) Filed in Color)

1400

(51) Int. Cl.
| | |
|---|---|
| *A24F 40/42* | (2020.01) |
| *A24F 40/53* | (2020.01) |
| *A24F 40/57* | (2020.01) |
| *A24F 40/60* | (2020.01) |
| *G05B 15/02* | (2006.01) |

(52) U.S. Cl.
CPC .............. *A24F 40/57* (2020.01); *G05B 15/02* (2013.01); *A24F 40/10* (2020.01)

(56) References Cited

U.S. PATENT DOCUMENTS

| | | | |
|---|---|---|---|
| 2014/0000638 A1 * | 1/2014 | Sebastian ................ | A24F 40/30 131/328 |
| 2014/0014126 A1 | 1/2014 | Peleg et al. | |
| 2014/0020693 A1 | 1/2014 | Cochand et al. | |
| 2014/0096782 A1 | 4/2014 | Ampolini | |
| 2015/0053220 A1 * | 2/2015 | Levy ..................... | A24F 40/485 131/329 |
| 2015/0208729 A1 | 7/2015 | Monsees et al. | |
| 2015/0357839 A1 | 12/2015 | Cai | |
| 2016/0174611 A1 * | 6/2016 | Monsees ................ | A24F 40/50 392/386 |
| 2017/0035110 A1 * | 2/2017 | Keen ....................... | A24F 40/44 |
| 2017/0207499 A1 | 7/2017 | Leadley | |
| 2017/0245551 A1 * | 8/2017 | Reevell ................... | G01F 23/22 |
| 2017/0251727 A1 * | 9/2017 | Nielsen ................... | A24F 40/40 |
| 2017/0360097 A1 | 12/2017 | Xiang | |
| 2018/0177240 A1 * | 6/2018 | Duque ................... | A24F 40/44 |
| 2018/0303161 A1 * | 10/2018 | Bilat ................... | A24B 15/167 |
| 2022/0408840 A1 * | 12/2022 | Adair ................... | A24F 40/485 |

FOREIGN PATENT DOCUMENTS

| | | | |
|---|---|---|---|
| EP | 2468116 A1 | 6/2012 | |
| EP | 2468117 A1 | 6/2012 | |
| EP | 2471392 B1 | 9/2013 | |
| EP | 2 654 469 A1 | 10/2013 | |
| EP | 1412829 B1 | 3/2014 | |
| EP | 2654471 B1 | 7/2014 | |
| EP | 2493342 B1 | 12/2014 | |
| EP | 2870888 B1 | 5/2015 | |
| EP | 3 039 974 A1 | 7/2016 | |
| EP | 2895930 B1 | 11/2016 | |
| EP | 2654469 B1 | 3/2017 | |
| EP | 2654470 B1 | 3/2017 | |
| EP | 2797446 B1 | 10/2017 | |
| EP | 3 406 147 A1 | 11/2018 | |
| JP | 2016-506729 A | 3/2016 | |
| JP | 2017-501805 A | 1/2017 | |
| JP | 2017-113016 A | 6/2017 | |
| RU | 2 629 878 C1 | 9/2017 | |
| WO | 2012/109371 A2 | 8/2012 | |
| WO | 2014/102091 A1 | 7/2014 | |
| WO | 2014/118286 A2 | 8/2014 | |
| WO | 2015/100361 A1 | 7/2015 | |
| WO | 2016/030661 A1 | 3/2016 | |
| WO | 2016/150922 A2 | 9/2016 | |
| WO | WO-2016183724 A1 * | 11/2016 ............ | A24F 47/00 |
| WO | 2017/084818 A1 | 5/2017 | |
| WO | 2017/141979 A1 | 8/2017 | |
| WO | 2017/144374 A1 | 8/2017 | |
| WO | 2017/144380 A1 | 8/2017 | |

OTHER PUBLICATIONS

Clarivate Analytics, "Machine translation of WO 2016/183724 A1," Translated Jan. 19, 2024. (Year: 2024).*
Russian Office Action issued Nov. 16, 2020, in corresponding Russian Patent Application No. 2020116743.
Japanese Office Action issued Aug. 13, 2020 in Japanese Patent Application No. 2019-549708.
Extended European search report issued on Oct. 15, 2020, in corresponding European patent Application No. 17929429.3, 8 pages.
Extended European search report issued on Oct. 15, 2020, in corresponding European patent Application No. 17929539.9, 8 pages.
Extended European Search Report issued Oct. 8, 2020 in European Patent Application No. 17929593.6 , 9 pages.
International Search Report and Written Opinion mailed on Jan. 23, 2018 for PCT/JP2017/038312 filed on Oct. 24, 2017, 7 pages including English Translation of the International Search Report.
International Search Report and Written Opinion mailed on Jan. 23, 2018 for PCT/JP2017/038297 filed on Oct. 24, 2017, 9 pages including English Translation of the International Search Report.
International Search Report and Written Opinion mailed on Jan. 23, 2018 for PCT/JP2017/038309 filed on Oct. 24, 2017, 7 pages including English Translation of the International Search Report.
U.S. Office Action issued Apr. 28, 2022 in U.S. Appl. No. 16/856,070, 40 pages.
U.S. Final Office Action issued Mar. 29, 2023 in co-pending U.S. Appl. No. 16/856,067, 34 pages.
Notice of Opposition of EP17929539.9 issued on Oct. 17, 2022, 46pp.
U.S. Office Action issued Feb. 1, 2024 in corresponding U.S. Appl. No. 16/856,067, 36 pages.

* cited by examiner

START

402 — HAS INHALATION BEEN DETECTED?    No

Yes

404 — TURN Q1 ON (CAUSE FIRST PATH TO FUNCTION)

406 — HAS INHALATION BEEN COMPLETED?    No

Yes

408 — TURN Q1 OFF

410 — TURN Q2 ON (CAUSE SECOND PATH TO FUNCTION)

412 — DETECT CURRENT VALUE OF SECOND PATH

414 — CALCULATE RESISTANCE VALUE OF LOAD

416 — CALCULATE TEMPERATURE OF LOAD

418 — LOAD TEMPERATURE > THRESHOLD    No

Yes

420 — DETECT INSUFFICIENCY OF AEROSOL SOURCE

END

400

600

700

800

1000

1302

1304

1300

1402

$n_{Err} = 0$

1404

MEASURE INHALATION INTERVAL, INHALATION CAPACITY, AND LENGTH OF INHALATION TIME PERIOD, AND THE LIKE

1406

DOES UNEXPECTED INHALATION OCCUR?    No

Yes

1408

$n_{Err}++$

1410

$n_{Err} >$ THRESHOLD?    No

Yes

1414

PERFORM CONTROL FOR PREVENTING TEMPORARY INSUFFICIENCY OF AEROSOL SOURCE IN RETENTION UNIT

1412

NOTIFY

END

1400

AEROSOL GENERATING APPARATUS AND METHOD AND PROGRAM FOR ACTUATING THE SAME

CROSS REFERENCE TO RELATED APPLICATIONS

The present application is a continuation application of International Application No. PCT/JP2017/038312, filed on Oct. 24, 2017.

TECHNICAL FIELD

The present disclosure relates to an aerosol generating apparatus that generates an aerosol to be inhaled by a user, and a method and program for actuating the same.

BACKGROUND ART

In an aerosol generating apparatus for generating an aerosol to be inhaled by a user, such as a general electronic cigarette, heated cigarette, or nebulizer, if the user performs inhalation when an aerosol source to be atomized to generate the aerosol is insufficient in quantity, a sufficient quantity of an aerosol cannot be supplied to the user. In addition, with the electronic cigarette and/or the heated cigarette, there is the problem that an aerosol having an unintended smoke flavor may be emitted.

As a solution to this problem, Patent Literature (PTL) 1 discloses a technique for detecting the depletion of the aerosol source based on a change in heater temperature while the electric power is being supplied to the heater for heating the aerosol source. In addition to PTL 1, PTL 2 to PTL 11 also disclose various techniques for solving the above-described problem or for possibly contributing to the solution to the above-described problem.

However, such conventional techniques cannot specifically identify in which portion of the aerosol generating apparatus the aerosol source is insufficient in quantity. Accordingly, there is still room of improvement in a configuration, operation method, and the like of the aerosol generating apparatus to perform an appropriate control when the aerosol source is insufficient in quantity.

CITATION LIST

Patent Literatures

PTL 1: European Patent Application Publication No. 2654469

PTL 2: European Patent Application Publication No. 1412829

PTL 3: European Patent Application Publication No. 2471392

PTL 4: European Patent Application Publication No. 2257195

PTL 5: European Patent Application Publication No. 2493342

PTL 6: European Patent Application Publication No. 2895930

PTL 7: European Patent Application Publication No. 2797446

PTL 8: European Patent Application Publication No. 2654471

PTL 9: European Patent Application Publication No. 2870888

PTL 10: European Patent Application Publication No. 2654470

PTL 11: International Publication No. WO 2015/100361

SUMMARY OF INVENTION

Technical Problem

In view of the foregoing, the present disclosure has been devised.

A first problem to be solved by the present disclosure is to provide an aerosol generating apparatus for performing an appropriate control when an aerosol source is insufficient in quantity, and a method and program for actuating the same.

A second problem to be solved by the present disclosure is to provide an aerosol generating apparatus for suppressing a temporary insufficiency of an aerosol source in a retention unit configured to retain the aerosol source supplied from a storage of an aerosol source, and a method and program for actuating the same.

Solution to Problem

In order to solve the first problem described above, according to a first embodiment of the present disclosure, there is provided an aerosol generating apparatus which comprises: a power supply; a load configured to generate heat upon receipt of electric power from the power supply and atomize an aerosol source; an element that is used to acquire a value related to a temperature of the load; a circuit configured to electrically connect the power supply and the load; a storage configured to store the aerosol source; a retention unit configured to retain the aerosol source supplied from the storage to allow the retained aerosol source to be in a feasible state of being heated by the load; and a control unit configured to distinguish between a first state of the aerosol generating apparatus in which the aerosol source stored in the storage is insufficient in quantity, and a second state of the aerosol generating apparatus in which the storage is capable of supplying the aerosol source while the aerosol source retained by the retention unit is insufficient in quantity, on the basis of a change in the value related to the temperature of the load after functioning of the circuit.

In an embodiment, due to the first state in which the aerosol source stored in the storage is insufficient in quantity, or to the second state in which the storage is capable of supplying the aerosol source while the aerosol source retained by the retention unit is insufficient in quantity, the temperature of the load exceeds a boiling point of the aerosol source or a temperature at which generation of an aerosol occurs by evaporation of the aerosol source.

In an embodiment, the circuit includes a first path and a second path that are connected in parallel to the power supply and the load, wherein the first path is used to atomize the aerosol source, and the second path is used to acquire the value related to the temperature of the load. The control unit is configured to cause the first path and the second path to alternately function.

In an embodiment, each of the first path and the second path includes a switch, and functions by switching the switch from an off-state to an on-state. The control unit is configured to provide a predetermined interval from when the switch of the first path is switched from the on-state to the off-state, to when the switch of the second path is switched from the off-state to the on-state.

In an embodiment, the first path has a resistance value smaller than the resistance value of the second path, and the control unit is configured to distinguish between the first state and the second state on the basis of a change in the value related to the temperature of the load after functioning of the first path or during functioning of the second path.

In an embodiment, the control unit is configured to distinguish between the first state and the second state on the basis of a time period elapsed from when the first path or the second path functions to when the value related to the temperature of the load reaches a threshold.

In an embodiment, the time period when the first state is determined to occur is shorter than the time period when the second state is determined to occur.

In an embodiment, the circuit includes a first path and a second path that are connected in parallel to the power supply and the load, wherein the first path is used to atomize the aerosol source, and the second path is used to acquire the value related to the temperature of the load. The control unit is configured to cause the second path to function after an operation of the first path has been completed.

In an embodiment, the control unit is configured to cause the second path to function after a plurality of times of operations of the first path have been completed.

In an embodiment, the control unit is configured to reduce the number of times of actuating the first path before causing the second path to function, as the number of operations or an operation amount of the load increases after the storage has been replaced with a new storage or after the aerosol source has been replenished in the storage.

In an embodiment, the first path has a resistance value smaller than a resistance value of the second path, and the control unit is configured to distinguish between the first state and the second state on the basis of a change in the value related to the temperature of the load after functioning of the first path or during functioning of the second path.

In an embodiment, the first path has a resistance value smaller than the resistance value of the second path, and the control unit is configured to distinguish between the first state and the second state on the basis of a change in the value related to the temperature of the load after an operation of the first path has been completed or during functioning of the second path.

In an embodiment, the first path has a resistance value smaller than the resistance value of the second path, and the control unit is configured to distinguish between the first state and the second state on the basis of a time derivative of the value related to the temperature of the load functioning of the second path.

In an embodiment, the time derivative when the second state is determined to occur is smaller than the time derivative when the first state is determined to occur.

In an embodiment, the circuit includes: a single path that is connected to the load in series, and is used to atomize the aerosol source and to acquire the value related to the temperature of the load; and a device configured to smooth electric power to be supplied to the load.

In an embodiment, the circuit includes a single path that is connected to the load in series, and is used to atomize the aerosol source and to acquire the temperature of the load, and the aerosol generating apparatus further includes a low-pass filter. The value related to the temperature of the load, acquired using the element, passes through the low-pass filter, and the control unit is configured to be capable of acquiring the value related to the temperature that has passed through the low-pass filter.

In an embodiment, the control unit is configured to distinguish between the first state and the second state on the basis of a time period elapsed from when the single path functions to when the value related to the temperature of the load reaches a threshold.

In an embodiment, the time period when the first state is determined to occur is shorter than the time period when the second state is determined to occur.

In an embodiment, the control unit is configured to correct a condition for distinguishing between the first state and the second state on the basis of one or more heat histories of the load obtained when the circuit has functioned.

In an embodiment, the control unit is configured to acquire a time series change of a request for generation of an aerosol based on the request, and correct the condition based on the heat history of the load derived from the time series change of the request.

In an embodiment, the control unit is configured to correct the condition to reduce the possibility that the first state is determined to occur, as a time interval from when the request has been completed to when the next request starts is shorter.

In an embodiment, the control unit is configured to make an influence of an old heat history included in the one or more heat histories of the load on the correction of the condition is smaller than an influence of a new heat history included in the one or more heat histories of the load on the correction of the condition.

In an embodiment, the control unit is configured to correct the condition on the basis of the one or more heat histories of the load derived from the temperature of the load when the circuit has functioned.

In an embodiment, the control unit is configured to correct the condition to reduce the possibility that the first state is determined to occur as the temperature of the load when circuit has functioned is higher.

According to the first embodiment of the present disclosure, there is provided a method of actuating an aerosol generating apparatus, which comprises the steps of: heating a load to atomize an aerosol source; and distinguishing between a first state of the aerosol generating apparatus in which the aerosol source stored is insufficient in quantity, and a second state of the aerosol generating apparatus in which the aerosol source stored is not insufficient in quantity while the aerosol source retained in a feasible state of being heated by the load is insufficient in quantity, on the basis of a change in a value related to a temperature of the load.

According to the first embodiment of the present disclosure, there is provided an aerosol generating apparatus which comprises: a power supply; a load configured to generate heat upon receipt of electric power from the power supply and atomize an aerosol source; an element that is used to acquire a value related to a temperature of the load; a circuit configured to electrically connect the power supply and the load; a storage configured to store the aerosol source; a retention unit configured to retain the aerosol source supplied from the storage to allow the retained aerosol source to be in a feasible state of being heated by the load; and a control unit configured to determine whether the aerosol generating apparatus is in a state in which the storage is capable of supplying the aerosol source while the aerosol source retained by the retention unit is insufficient in quantity, on the basis of a change in the value related to the temperature of the load after functioning of the circuit.

In an embodiment, due to the state in which the storage is capable of supplying the aerosol source while the aerosol source retained by the retention unit is insufficient in quantity, the temperature of the load exceeds a boiling point of the aerosol source.

According to the first embodiment of the present disclosure, there is provided a method of actuating an aerosol generating apparatus, which comprises the steps of: heating a load to atomize an aerosol source; and determining whether the aerosol generating apparatus is in a state in which the aerosol source stored is not insufficient in quantity while the aerosol source retained in a feasible state of being heated by the load is insufficient in quantity, on the basis of a change in a value related to a temperature of the load.

According to the first embodiment of the present disclosure, there is provided an aerosol generating apparatus which comprises: a power supply; a load configured to generate heat upon receipt of electric power from the power supply and atomize an aerosol source; an element that is used to acquire a value related to a temperature of the load; a circuit configured to electrically connect the power supply and the load; a storage configured to store the aerosol source; a retention unit configured to retain the aerosol source supplied from the storage to allow the retained aerosol source to be in a feasible state of being heated by the load; and a control unit configured to distinguish between a first state of the aerosol generating apparatus in which the aerosol source stored in the storage is insufficient in quantity, and a second state of the aerosol generating apparatus in which the storage is capable of supplying the aerosol source while the aerosol source retained by the retention unit is insufficient in quantity, on the basis of a change in the value related to the temperature of the load after functioning of the circuit, wherein, due to the first state in which the aerosol source stored in the storage is insufficient in quantity, or to the second state in which the storage is capable of supplying the aerosol source while the aerosol source retained by the retention unit is insufficient in quantity, the temperature of the load reaches a predetermined temperature below a boiling point of the aerosol source or a temperature at which generation of an aerosol occurs by evaporation of the aerosol source, earlier than in another state different from the first state and the second state.

According to the first embodiment of the present disclosure, there is provided a method of actuating an aerosol generating apparatus, which comprises the steps of: heating a load to atomize an aerosol source; and distinguishing between a first state of the aerosol generating apparatus in which the aerosol source stored is insufficient in quantity, and a second state in which the aerosol source stored is not insufficient in quantity while the aerosol source retained in a feasible state of being heated by the load is insufficient in quantity, on the basis of a change in a value related to a temperature of the load, wherein, due to the first state in which the aerosol source stored is insufficient in quantity, or to the second state in which the aerosol source stored is not insufficient in quantity while the aerosol source retained in the feasible state of being heated by the load is insufficient in quantity, the temperature of the load reaches a predetermined temperature below a boiling point of the aerosol source or a temperature at which generation of an aerosol occurs by evaporation of the aerosol source, earlier than in another state different from the first state and the second state.

According to the first embodiment of the present disclosure, there is provided a program for, when being executed by a processor, causing the processor to perform any of the above-described methods.

In order to solve the second problem described above, according to a second embodiment of the present disclosure, there is provided an aerosol generating apparatus which comprises: a power supply; a load configured to generate heat upon receipt of electric power from the power supply and atomize an aerosol source; an element that is used to acquire a value related to a temperature of the load; a circuit configured to electrically connect the power supply and the load; a storage configured to store the aerosol source; a retention unit configured to retain the aerosol source supplied from the storage to allow the retained aerosol source to be in a feasible state of being heated by the load; and a control unit configured to, upon detection of a dry state in which the temperature of the load exceeds a boiling point of the aerosol source due to a condition where the storage is capable of supplying the aerosol source while the aerosol source retained by the retention unit is insufficient in quantity, or upon detection of a sign of the dry state, perform a control to increase a retaining quantity of the aerosol source retained by the retention unit or a control to improve a possibility of increasing the retaining quantity, at at least one of a time of starting a supply of the electric power from the power supply to the load and a time of completing the supply of the electric power from the power supply to the load.

In an embodiment, the aerosol generating apparatus includes a notifier configured to provide a notification to a user, and the control unit is configured to cause the notifier to function upon detection of the dry state or the sign of the dry state.

In an embodiment, the control unit is configured to perform a control to make an interval from a completion of generation of an aerosol to a start of subsequent generation of an aerosol, longer than a previous interval, upon detection of the dry state or the sign of the dry state.

In an embodiment, the aerosol generating apparatus includes a notifier configured to provide a notification to a user, and the control unit is configured to cause the notifier to function upon detection of the dry state or the sign of the dry state, and perform a control to make a next interval longer than the previous interval upon further detection of the dry state or the sign of the dry state after causing the notifier to function one or more times.

In an embodiment, the control unit is configured to correct a length of the interval based on at least one of a viscosity of the aerosol source, a residual quantity of the aerosol source, an electric resistance value of the load, and a temperature of the power supply.

In an embodiment, the aerosol generating apparatus includes a supplier capable of adjusting at least one of the quantity and rate of the aerosol source to be supplied from the storage to the retention unit. The control unit is configured to, upon detection of the dry state or the sign of the dry state, control the supplier to increase at least one of the quantity and rate of the aerosol source to be supplied from the storage to the retention unit.

In an embodiment, the control unit is configured to control the circuit to reduce the quantity of the generated aerosol upon detection of the dry state or the sign of the dry state.

In an embodiment, the aerosol generating apparatus includes a temperature adjuster capable of adjusting a temperature of the aerosol source. The control unit is configured to control the temperature adjuster to heat the aerosol source upon detection of the dry state or the sign of the dry state.

In an embodiment, the control unit is configured to control the temperature adjuster to heat the aerosol source during an aerosol is not generated by the load.

In an embodiment, the control unit is configured to use the load as the temperature adjuster.

In an embodiment, the aerosol generating apparatus includes a changing unit capable of changing an air-flow resistance in the aerosol generating apparatus. The control unit is configured to control the changing unit to increase the air-flow resistance upon detection of the dry state or the sign of the dry state.

In an embodiment, the aerosol generating apparatus includes a requesting unit that outputs a request for generation of an aerosol. The control unit is configured to control the circuit in accordance with a correlation in which as the request becomes larger, the quantity of the generated aerosol is increased, and, upon detection of the dry state or the sign of the dry state, correct the correlation to reduce the quantity of the generated aerosol corresponding to a magnitude of the request.

In an embodiment, the control unit is configured to be capable of performing a first mode of performing a control to make an interval from a completion of generation of an aerosol to a start of subsequent generation of an aerosol, longer than a previous interval, and a second mode of performing a control to increase the retaining quantity of the aerosol source or a control to improve the possibility of increasing the retaining quantity without performing a control of the interval, at at least one of a time of starting a supply of the electric power to the load, and a time of completing the supply of the electric power from the power supply to the load. The control unit is configured to perform the second mode in preference to the first mode upon detection of the dry state or the sign of the dry state.

In an embodiment, the control unit is configured to perform the first mode upon further detection of the dry state or the sign of the dry state after performing the second mode.

In an embodiment, the control unit is configured to detect the dry state based on a change in the temperature of the load after causing the circuit to function.

In an embodiment, the aerosol generating apparatus includes a requesting unit configured to output a request for generation of an aerosol. The control unit is configured to detect the sign of the dry state based on a time series change of the request.

According to the second embodiment of the present disclosure, there is provided a method of actuating an aerosol generating apparatus, which comprises the steps of: heating a load to atomize an aerosol source; and, upon detection of a dry state in which the temperature of the load exceeds a boiling point of the aerosol source due to a condition where the aerosol source stored is not insufficient in quantity while the aerosol source retained in a feasible state of being heated by the load is insufficient in quantity, or upon detection of a sign of the dry state, performing a control to increase a retaining quantity of the aerosol source retained or a control to improve a possibility of increasing the retaining quantity, at at least one of a time of starting a supply of the electric power to the load and a time of completing the supply of the electric power to the load.

According to the second embodiment of the present disclosure, there is provided an aerosol generating apparatus which comprises: a power supply; a load configured to generate heat upon receipt of electric power from the power supply and atomize an aerosol source; an element that is used to acquire a value related to a temperature of the load; a circuit configured to electrically connect the power supply and the load; a storage configured to store the aerosol source; a retention unit configured to retain the aerosol source supplied from the storage to allow the retained aerosol source to be in a feasible state of being heated by the load; and a control unit configured to perform a control to suppress generation of an aerosol or a control to improve a possibility of suppressing generation of an aerosol, in an interval corresponding to a time period until when the aerosol source with a quantity greater than or equal to a quantity used for generation of an aerosol is supplied from the storage to the retention unit after a completion of generation of the aerosol.

In an embodiment, the aerosol generating apparatus includes a notifier configured to provide a notification to a user. The control unit is configured to control the notifier in a first mode during an aerosol is generated, and control the notifier in a second mode different from the first mode, during the interval.

In an embodiment, the aerosol generating apparatus includes a requesting unit configured to output a request for generation of an aerosol. The control unit is configured to control the notifier in a third mode different from the second mode when the control unit acquires the request during the interval.

In an embodiment, the control unit is configured to control the circuit to inhibit generation of an aerosol during the interval.

In an embodiment, the aerosol generating apparatus includes a requesting unit configured to output a request for generation of an aerosol. The control unit is configured to correct a length of the interval based on at least one of a magnitude and change of the request.

According to the second embodiment of the present disclosure, there is provided a method of actuating an aerosol generating apparatus, which comprises the steps of: heating a load to atomize an aerosol source and generating an aerosol; and performing a control to suppress generation of an aerosol or a control to improve a possibility of suppressing generation of an aerosol, in an interval corresponding to a time period until when the aerosol source stored with a quantity greater than or equal to a quantity used for generation of an aerosol is retained in a feasible state of being heated by the load after a completion of generation of the aerosol.

According to the second embodiment of the present disclosure, there is provided an aerosol generating apparatus which comprises: a power supply; a load configured to generate heat upon receipt of electric power from the power supply and atomize an aerosol source; an element that is used to acquire a value related to a temperature of the load; a circuit configured to electrically connect the power supply and the load; a storage configured to store the aerosol source; a retention unit configured to retain the aerosol source supplied from the storage to allow the retained aerosol source to be in a feasible state of being heated by the load; and a control unit configured to, when the storage is capable of supplying the aerosol source while the aerosol source retained by the retention unit is insufficient in quantity, perform a control to increase a retaining quantity of the aerosol source retained by the retention unit or a control to improve a possibility of increasing the retaining quantity, at at least one of a time of starting a supply of the electric power from the power supply to the load and a time of completing the supply of the electric power from the power supply to the load.

According to the second embodiment of the present disclosure, there is provided a method of actuating an aerosol generating apparatus, which comprises the steps of: heating a load to atomize an aerosol source; and, when the aerosol source stored is not insufficient in quantity while the aerosol source retained in a feasible state of being heated by the load is insufficient in quantity, performing a control to increase a retaining quantity of the aerosol source retained or a control to improve a possibility of increasing the retaining quantity, at at least one of a time of starting the electric power to the load starts and a time of completing the electric power to the load.

According to the second embodiment of the present disclosure, there is provided a program for, when being executed by a processor, causing the processor to perform any of the above-described methods.

In order to solve the first problem described above, according to a third embodiment of the present disclosure, there is provided an aerosol generating apparatus which comprises: a power supply; a load configured to generate heat upon receipt of electric power from the power supply and atomize an aerosol source; an element that is used to acquire a value related to a temperature of the load; a circuit configured to electrically connect the power supply and the load; a storage configured to store the aerosol source; a retention unit configured to retain the aerosol source supplied from the storage to allow the retained aerosol source to be in a feasible state of being heated by the load; and a control unit configured to: distinguish between a first state of the aerosol generating apparatus in which the aerosol source stored in the storage is insufficient in quantity, and a second state in which the storage is capable of supplying the aerosol source while the aerosol source retained by the retention unit is insufficient in quantity, on the basis of a change in the value related to the temperature of the load after functioning of the circuit or during functioning of the circuit; perform a first control upon detection of the first state; and perform a second control different from the first control upon detection of the second state.

In an embodiment, due to the first state in which the aerosol source stored in the storage is insufficient in quantity, or to the second state in which the storage is capable of supplying the aerosol source while the aerosol source retained by the retention unit is insufficient in quantity, a temperature of the load exceeds a boiling point of the aerosol source.

In an embodiment, in the second control, the quantity of the aerosol source stored in the storage decreases larger than in the first control.

In an embodiment, in a control to be performed by the control unit in the second control, a larger number of variables and/or a larger number of algorithms are changed, than in the control to be performed by the control unit in the first control.

In an embodiment, the number of operations required for the user to allow for generation of an aerosol in the second control is smaller than the number of operations required for the user to allow for generation of an aerosol in the first control.

In an embodiment, the control unit is configured to prohibit generation of an aerosol for at least a predetermined time period, in the first control and the second control.

In an embodiment, a time period during which generation of an aerosol is inhibited in the second control is shorter than the time period during which generation of an aerosol is inhibited in the first control.

In an embodiment, the first control and the second control have return conditions respectively each for a shift from a state in which generation of an aerosol is inhibited to a state in which generation of an aerosol is allowed. The return condition in the first control is stricter than the return condition in the second control.

In an embodiment, the number of replacement operations of a component in the aerosol generating apparatus, which is included in the return condition in the first control, is larger than the number of replacement operations of the component in the aerosol generating apparatus which is included in the return condition in the second control.

In an embodiment, the aerosol generating apparatus includes one or more notifiers configured to provide a notification to a user. The number of notifiers functioning in the first control is larger than the number of notifiers functioning in the second control.

In an embodiment, the aerosol generating apparatus includes one or more notifiers configured to provide a notification to a user. A time period during which the one or more notifiers function in the first control is longer than the time period during which the one or more notifiers function in the second control.

In an embodiment, the aerosol generating apparatus includes one or more notifiers configured to provide a notification to a user. An amount of electric power to be supplied from the power supply to the one or more notifiers in the first control is larger than the amount of electric power to be supplied from the power supply to the one or more notifiers in the second control.

According to the third embodiment of the present disclosure, there is provided a method of actuating an aerosol generating apparatus, which comprises the steps of: heating a load to atomize an aerosol source; distinguishing between a first state of the aerosol generating apparatus in which the aerosol source stored is insufficient in quantity, and a second state of the aerosol generating apparatus in which the aerosol source stored is not insufficient in quantity while the aerosol source retained in a feasible state of being heated by the load is insufficient in quantity, on the basis of a change in a value related to a temperature of the load after atomization of the aerosol source or during atomization of the aerosol source; performing a first control upon detection of the first state; and performing a second control different from the first control upon detection of the second state.

In an embodiment, due to the first state in which the aerosol source stored in the storage is insufficient in quantity, or to the second state in which the storage is capable of supplying the aerosol source while the aerosol source retained by the retention unit is insufficient in quantity, the temperature of the load exceeds a boiling point of the aerosol source.

According to the third embodiment of the present disclosure, there is provided a program for, when being executed by a processor, causing the processor to perform any of the above-described methods.

Advantageous Effects of Invention

According to the first embodiment of the present disclosure, it is possible to provide an aerosol generating apparatus that performs an appropriate control when an aerosol source is insufficient in quantity, and to provide a method and program for actuating the same.

According to the second embodiment of the present disclosure, it is possible to provide an aerosol generating apparatus that suppresses a temporary insufficiency of an aerosol source in a retention unit configured to retain the aerosol source supplied from a storage of an aerosol source, and to provide a method and program for actuating the same.

According to the third embodiment of the present disclosure, it is possible to provide an aerosol generating apparatus that performs an appropriate control when an aerosol source is insufficient in quantity, and to provide a method and program for actuating the same.

BRIEF DESCRIPTION OF DRAWINGS

The patent or application contains at least one drawing executed in color. Copies of this patent or patent application publication with color drawing(s) will be provided by the Office upon request and payment of the necessary fee.

FIG. 1B is a schematic block diagram of a configuration of an aerosol generating apparatus according to an embodiment of the present disclosure.

FIG. 13A is a graph schematically showing a time series change of a resistance value of the load when a time period required for cooling the load becomes longer than that in a normal case due to degradation of the load and the like.

DESCRIPTION OF EMBODIMENTS

Hereinafter, embodiments of the present disclosure will be described in detail with reference to the drawings. Note that, although the embodiments of the present disclosure include an electronic cigarette, a heated cigarette, and a nebulizer, no limitation thereto is intended. The embodiments of the present disclosure can include various aerosol generating apparatuses for generating an aerosol to be inhaled by a user.

Figure 1A:
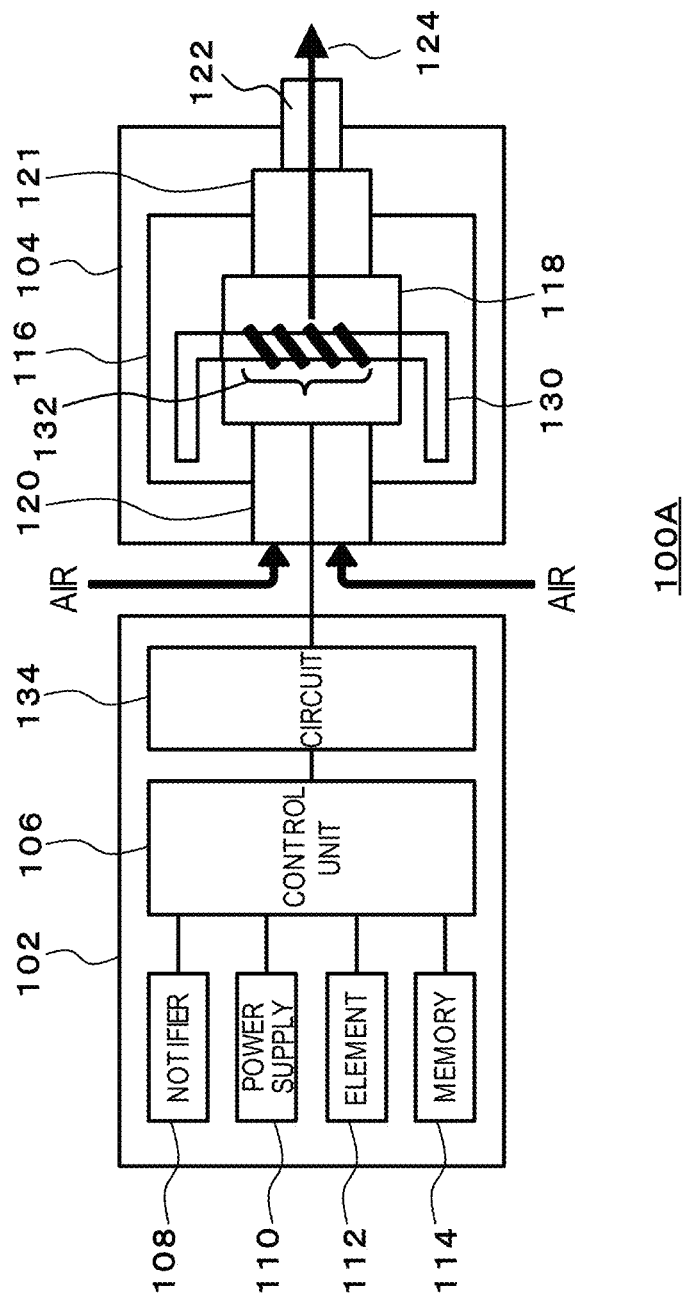
FIG. 1A is a schematic block diagram of a configuration of an aerosol generating apparatus according to an embodiment of the present disclosure.

FIG. 1A is a schematic block diagram of a configuration of an aerosol generating apparatus 100A according to an embodiment of the present disclosure. It should be noted that FIG. 1A schematically and conceptually illustrates components included in the aerosol generating apparatus 100A and does not illustrate strict dispositions, shapes, dimensions, positional relations, and the like of the components and the aerosol generating apparatus 100A.

As illustrated in FIG. 1A, the aerosol generating apparatus 100A includes a first member 102 and a second member 104. As illustrated in the figure, as an example, the first member 102 may include a control unit 106, a notifier 108, a power supply 110, an element 112 such as a sensor, and a memory 114. The first member 102 may also include a circuit 134 described later. As an example, the second member 104 may include a storage 116, an atomizer 118, an air intake channel 120, an aerosol flow path 121, a mouthpiece 122, a retention unit 130, and a load 132. Some of the components included in the first member 102 may be included in the second member 104. Some of the components included in the second member 104 may be included in the first member 102. The second member 104 may be configured to be detachably attached to the first member 102. Alternatively, all the components included in the first member 102 and the second member 104 may be included in the same housing instead of the first member 102 and the second member 140.

The storage 116 may be configured as a tank that stores liquid. The aerosol source is liquid, for example, polyalcohol such as glycerin or propylene glycol, or water. When the aerosol generating apparatus 100A is an electronic cigarette, the aerosol source in the storage 116 may include a tobacco material that emits smoke flavor ingredients by being heated or an extract deriving from the tobacco material. The retention unit 130 retains the aerosol source. For example, the retention unit 130 is formed of a fibrous or porous material, and retains the aerosol source as liquid in gaps among fibers or thin holes of a porous material. For example, cotton, glass fiber, a tobacco material or the like can be used as the above-mentioned fibrous or porous material. When the aerosol generating apparatus 100A is a medical inhaler such as a nebulizer, the aerosol source may also include a drug to be inhaled by a patient. As another example, the storage 116 may have a configuration in which a consumed aerosol source can be replenished. Alternatively, the storage 116 itself may be configured to be replaceable when the aerosol source is consumed. The aerosol source is not limited to the liquid, and may be solid. When the aerosol source is solid, the storage 116 may be, for example, a hollow container.

The atomizer 118 is configured to atomize the aerosol source and generate an aerosol. When an inhaling action is detected by the element 112, the atomizer 118 generates the aerosol. For example, the retention unit 130 is provided to couple the storage 116 and the atomizer 118. In this case, a part of the retention unit 130 communicates with the inside of the storage 116 and is in contact with the aerosol source. A different part of the retention unit 130 extends toward the atomizer 118. Note that a different part of the retention unit 130 extending to the atomizer 118 may be accommodated in the atomizer 118, or may communicate with the inside of the storage 116 again through the atomizer 118. The aerosol source is carried from the storage 116 to the atomizer 118 by capillary effect of the retention unit 130. As an example, the atomizer 118 includes a heater including the load 132 that is electrically connected to the power supply 110. The heater is disposed in contact with or in close contact with the retention unit 130. When an inhaling action is detected, the control unit 106 controls the heater of the atomizer 118 to heat the aerosol source carried through the retention unit 130 to thereby atomize the aerosol source. Another example of the atomizer 118 may be an ultrasonic atomizer that atomizes the aerosol source by ultrasonic vibration. The air intake channel 120 is connected to the atomizer 118, and communicates with an external space to the aerosol generating apparatus 100A. The aerosol generated in the atomizer 118 is mixed with air taken in via the air intake channel 120. Mixed fluid of the aerosol and the air is delivered to the aerosol flow path 121 as indicated by an arrow 124. The aerosol flow path 121 has a tubular structure for transporting, to the mouthpiece 122, the mixed fluid of the air and the aerosol generated in the atomizer 118.

The mouthpiece 122 is located at a terminal end of the aerosol flow path 121, and is configured to open the aerosol flow path 121 to the external space to the aerosol generating apparatus 100A. The user holds the mouthpiece 122 in the user's mouth and performs the inhalation to thereby take the air containing an aerosol in the user's mouth.

The notifier 108 may include a light emitting element such as an LED, a display, a speaker, a vibrator, or the like. The notifier 108 is configured to provide some notification to the user with light emission, display, sound production, vibration, or the like according to necessity.

The power supply 110 supplies electric power to each of the components such as the notifier 108, the element 112, the memory 114, the load 132, and the circuit 134 of the aerosol generating apparatus 100A. The power supply 110 can also be charged by being connected to an external power supply via a predetermined port (not illustrated) of the aerosol generating apparatus 100A. Only the power supply 110 may be detachable from the first member 102 or the aerosol generating apparatus 100A, and may be replaceable with a new power supply 110. The power supply 110 may be replaceable with a new power supply 110 by replacing the entire first member 102 with a new first member 102.

The element 112 is a component used to acquire a value related to a temperature of the load 132. The element 112 may be configured to be used to acquire a value required for obtaining a value of a current flowing through the load 132, a resistance value of the load 132, and the like.

The element 112 may also include a pressure sensor that detects fluctuation in pressure in the air intake channel 120 and/or the aerosol flow path 121, or a flow sensor that detects a flow rate in the air intake channel 120 and/or the aerosol flow path 121. The element 112 may also include a weight sensor that detects a weight of a component such as the storage 116. The element 112 may also be configured to count the number of times the user puffs using the aerosol generating apparatus 100A. The element 112 may also be configured to integrate the time of energization of the atomizer 118. The element 112 may also be configured to detect a height of a liquid surface in the storage 116. The element 112 may also be configured to obtain or detect an SOC (State of Charge), a current integrated value, a voltage and the like of the power supply 110. The SOC may be obtained by a current integration method (coulomb counting method), an SOC-OCV (Open Circuit Voltage) method, or the like. The element 112 may also be an operation button or the like operable by the user.

The control unit 106 may be an electronic circuit module configured as a microprocessor or a microcomputer. The control unit 106 may be configured to control the operation of the aerosol generating apparatus 100A according to computer executable instructions stored in the memory 114. The memory 114 is a storage medium such as a ROM, a RAM. or a flash memory. In the memory 114, in addition to the above-mentioned computer executable instructions, setting data required for controlling the aerosol generating apparatus 100A and the like may be stored. For example, the memory 114 may store various pieces of data such as data indicating a control method of the notifier 108 (e.g., mode such as light emission, sound production, or vibration), a value acquired and/or detected by the element 112, and a heating history of the atomizer 118. The control unit 106 reads data from the memory 114 as required for control of the aerosol generating apparatus 100A, and stores the read data in the memory 114 as required.

Figure 1B:
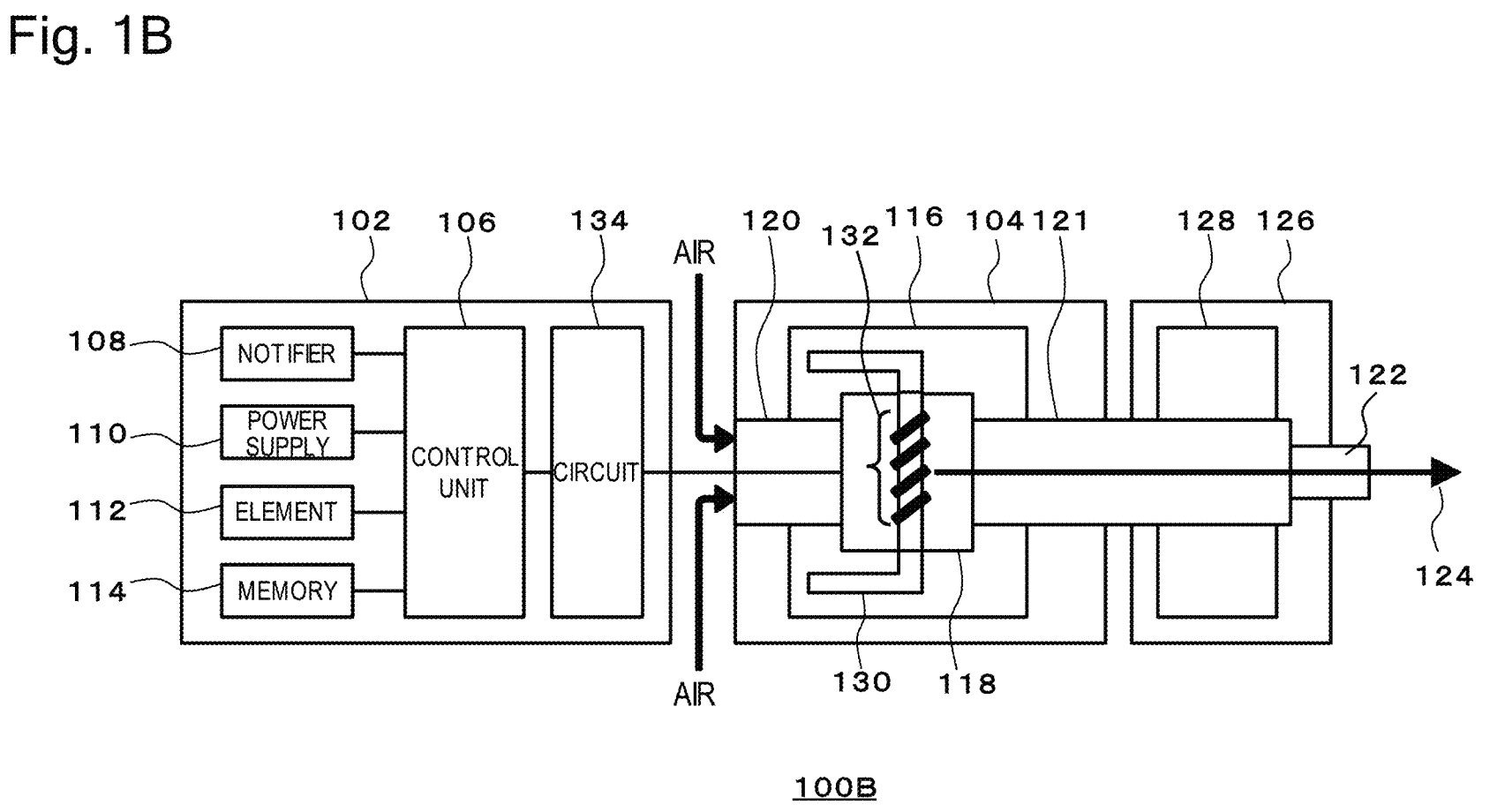

FIG. 1B is a schematic block diagram of a configuration of an aerosol generating apparatus 100B according to an embodiment of the present disclosure.

As illustrated in the figure, the aerosol generating apparatus 100B includes a third member 126 in addition to the configuration of the aerosol generating apparatus 100A of FIG. 1A. The third member 126 may include a flavor source 128. As an example, when the aerosol generating apparatus 100B is an electronic cigarette or a heated cigarette, the flavor source 128 may contain smoke flavor ingredients contained in tobacco. As illustrated in the figure, the aerosol flow path 121 extends from the second member 104 to the third member 126. The mouthpiece 122 is included in the third member 126.

The flavor source 128 is a component for imparting flavor to the aerosol. The flavor source 128 is disposed in the part of the aerosol flow path 121. A mixed fluid of air and the aerosol generated by the atomizer 118 (hereinafter, it should be noted that the mixed fluid may be simply referred to as "aerosol") flows through the aerosol flow path 121 to the mouthpiece 122. In this manner, the flavor source 128 is provided downstream of the atomizer 118 with respect to the aerosol flow. In other words, the flavor source 128 is located closer to the mouthpiece 122 in the aerosol flow path 121 than the atomizer 118. Accordingly, the aerosol generated by the atomizer 118 passes through the flavor source 128 and then reaches the mouthpiece 122. When the aerosol passes through the flavor source 128, the aerosol is imparted with the smoke flavor ingredients contained in the flavor source 128. As an example, when the aerosol generating apparatus 100B is an electronic cigarette or a heated cigarette, the flavor source 128 may be derived from tobacco such as shredded tobacco or a processed product obtained by forming a tobacco material into a particulate, sheet-like, or powder-like form. The flavor source 128 may also be derived from material other than tobacco made from plants (for example, mint, herb, etc.) different from tobacco. As an example, the flavor source 128 contains a nicotine ingredient. The flavor source 128 may contain perfume ingredients such as menthol. In addition to the flavor source 128, the storage 116 may also have substances containing smoke flavor ingredients. For example, the aerosol generating apparatus 100B may be configured to retain flavor substances derived from tobacco in the flavor source 128 and contain flavor substances derived from the material other than tobacco in the storage 116.

The user can take air containing the aerosol imparted with flavor in the user's mouth by holding the mouthpiece 122 in the user's mouth and performing the inhalation.

The control unit 106 is configured to control, by various methods, the aerosol generating apparatuses 100A and 100B (hereinafter also collectively referred to as an "aerosol generating apparatus 100") according to the embodiment of the present disclosure.

In the aerosol generating apparatus, if the user performs the inhalation when the aerosol source is insufficient in quantity, a sufficient quantity of an aerosol cannot be supplied to the user. In addition, in the case of the electronic cigarette or the heated cigarette, the aerosol having an unintended smoke flavor may be emitted (hereinafter, such a phenomenon is also referred to as "unintended behavior"). The inventors of the present application have recognized, as an important problem to be solved, the fact that the unintended behavior occurs, not only when the aerosol source in the storage 116 is insufficient in quantity, but also when a sufficient quantity of aerosol source remains in the storage 116 while the aerosol source in the retention unit 130 is temporarily insufficient in quantity. In order to solve such a problem, the inventors of the present application have invented an aerosol generating apparatus capable of identifying which one of the aerosol source in the storage 116 and the aerosol source in the retention unit 130 is insufficient in quantity, and invented a method and program for actuating the aerosol generating apparatus. The inventors of the present application have also invented an aerosol generating apparatus for suppressing a temporary insufficiency of an aerosol source in the retention unit configured to retain the aerosol source supplied from the storage of an aerosol source, and invented a method and program for actuating the aerosol generating apparatus. The inventors of the present application have also invented an aerosol generating apparatus capable of performing an appropriate control when distinguishing between a state of the aerosol generating apparatus 100 in which the aerosol source stored in the storage 116 is insufficient in quantity, and a different state in which the storage 116 is capable of supplying the aerosol source while the aerosol source retained by the retention unit 130 is insufficient in quantity, and invented a method and program for actuating the aerosol generating apparatus. Hereinafter, each embodiment of the present disclosure will be described in detail, mainly assuming a case where the aerosol generating apparatus has a configuration illustrated in FIG. 1A. However, it is apparent to a person skilled in the art that the embodiment of the present disclosure is also applicable to cases where the aerosol generating apparatus has each of various configurations such as the configuration illustrated in FIG. 1B.

First Embodiment

Figure 2:
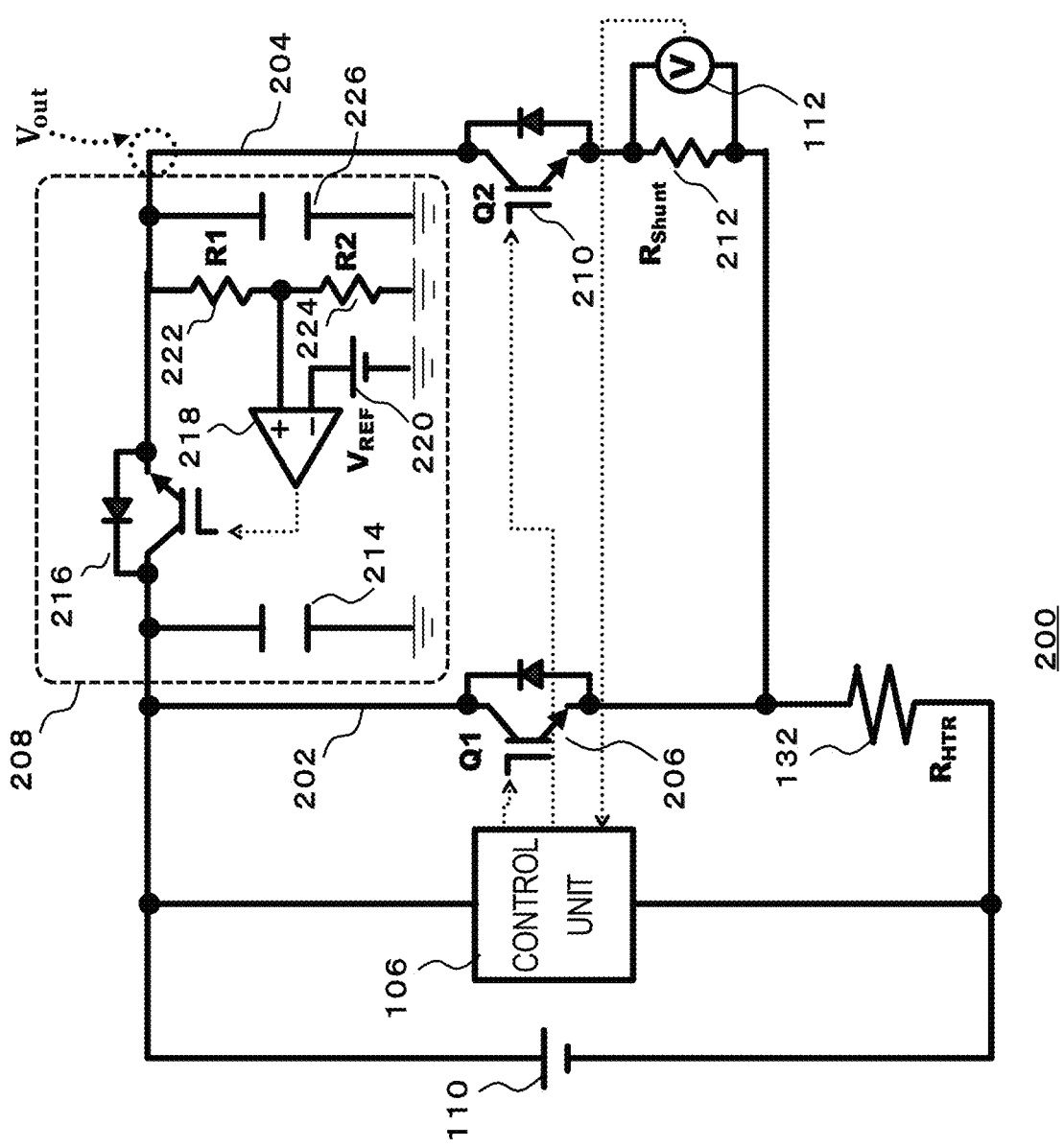
FIG. 2 is a diagram illustrating an exemplary circuit configuration of a portion of an aerosol generating apparatus according to a first embodiment of the present disclosure.

FIG. 2 is a diagram illustrating an exemplary circuit configuration of a portion of the aerosol generating apparatus 100A according to a first embodiment of the present disclosure.

A circuit 200 illustrated in FIG. 2 includes the power supply 110, the control unit 106, the element 112, the load 132 (also referred to as a "heater resistor"), a first path 202, a second path 204, a switch Q1 including a first field effect transistor (FET) 206, a constant voltage output circuit 208, a switch Q2 including a second FET 210, and a resistor 212 (also referred to as a "shunt resistor"). It is apparent to a person skilled in the art that not only FET but also various elements such as an iGBT and a contactor can be used as the switches Q1 and Q2.

The circuit 134 illustrated in FIG. 1A may be electrically connected to the power supply 110 and the load 132, and may include the first path 202 and the second path 204. The first path 202 and the second path 204 are connected in parallel to the power supply 110 (and the load 132). The first path 202 may include the switch Q1. The second path 204 may include the switch Q2, the constant voltage output circuit 208, the resistor 212, and the element 112. The first path 202 may have a resistance value smaller than that of the second path 204. In this example, the element 112 is a voltage sensor, and is configured to detect a voltage value across the resistor 212. However, the configuration of the element 112 is not limited thereto. For example, the element 112 may be a current sensor, and may be configured to detect a value of a current flowing through the resistor 212.

As indicated by dotted-line arrows in FIG. 2, the control unit 106 can control the switch Q1, the switch Q2, and the like, and can acquire a value detected by the element 112. The control unit 106 may be configured to switch the switch Q1 from an off-state to an on-state to cause the first path 202 to function and configured to switch the switch Q2 from the off-state to the on-state to cause the second path 204 to function. The control unit 106 may be configured to perform alternate switching between the switches Q1 and Q2 to cause the first path 202 and the second path 204 to alternately function. With this configuration, as described later, even after generation of the aerosol (after the user's inhalation) or even during generation of the aerosol (during the user's inhalation), the control unit 106 can distinguish between a first state of the aerosol generating apparatus 100 (a state in which the aerosol source stored in the storage 116 is insufficient in quantity), and a second state of the aerosol generating apparatus 100 (a state in which the storage 116 is capable of supplying the aerosol source while the aerosol source retained by the retention unit 130 is insufficient in quantity), to detect an insufficiency of the aerosol source.

The control unit 106 may be configured to provide a predetermined interval from when the switch Q1 of the first path 202 is switched from the on-state to the off-state to when the switch Q2 of the second path 204 is switched from the off-state to the on-state.

The first path 202 is used to atomize the aerosol source. When the switch Q1 is switched to the on-state to cause the first path 202 to function, the electric power is supplied to the heater (or the load 132 in the heater), and the load 132 is heated. The aerosol source retained by the retention unit 130 in the atomizer 118 is atomized through heating by the load 132, and thereby, an aerosol is generated.

The second path 204 is used to acquire a value related to the temperature of the load 132. As an example, it is assumed that the element 112 included in the second path 204 is a voltage sensor as illustrated in FIG. 2. When the switch Q2 is turned on and the second path 204 is functioning, the current flows through the constant voltage output circuit 208, the switch Q2, the resistor 212, and the load 132. A value of the current flowing through the load 132 can be obtained using a value of a voltage applied to the resistor 212, the value of the voltage being acquired by the element 112, and a known resistance value $R_{shunt}$ of the resistor 212. Since a total value of the resistance values of the resistor 212 and the load 132 can be obtained based on an output voltage $V_{out}$ of the constant voltage output circuit 208 and the obtained current value, a resistance value $R_{HTR}$ of the load 132 can be obtained by subtracting the known resistance value $R_{shunt}$ from the total value. When the load 132 has a positive or negative temperature coefficient characteristic in which the resistance value is changed depending on the temperature, the temperature of the load 132 can be estimated based on both the resistance value $R_{HTR}$ of the load 132 obtained as described above and a relationship between the previously measured resistance value of the load 132 and the temperature of the load 132. The value related to the temperature of the load 132 in this example is a voltage applied to the resistor 212. However, it will be appreciated by a person skilled in the art that the temperature of the load 132 can be estimated using a value of the current flowing through the resistor 212. Therefore, a specific example of the element 112 is not limited to the voltage sensor, and may include a different element such as a current sensor (for example, a hall element).

In FIG. 2, the constant voltage output circuit 208 is illustrated as being a linear dropout (LDO) regulator, and may include a capacitor 214, an FET 216, an error amplifier 218, a reference voltage source 220, resistors 222 and 224, and a capacitor 226. When a voltage of the reference voltage source 220 is represented as $V_{REF}$, and resistance values of the resistors 222 and 224 are represented as R1 and R2, respectively, the output voltage $V_{OUT}$ of the constant voltage output circuit 208 is represented as $V_{OUT}=(R2/(R1+R2))\times V_{REF}$. It is to be understood to a person skilled in the art that the configuration of the constant voltage output circuit 208 illustrated in FIG. 2 is merely one example, and various configurations are possible.

Figure 3:
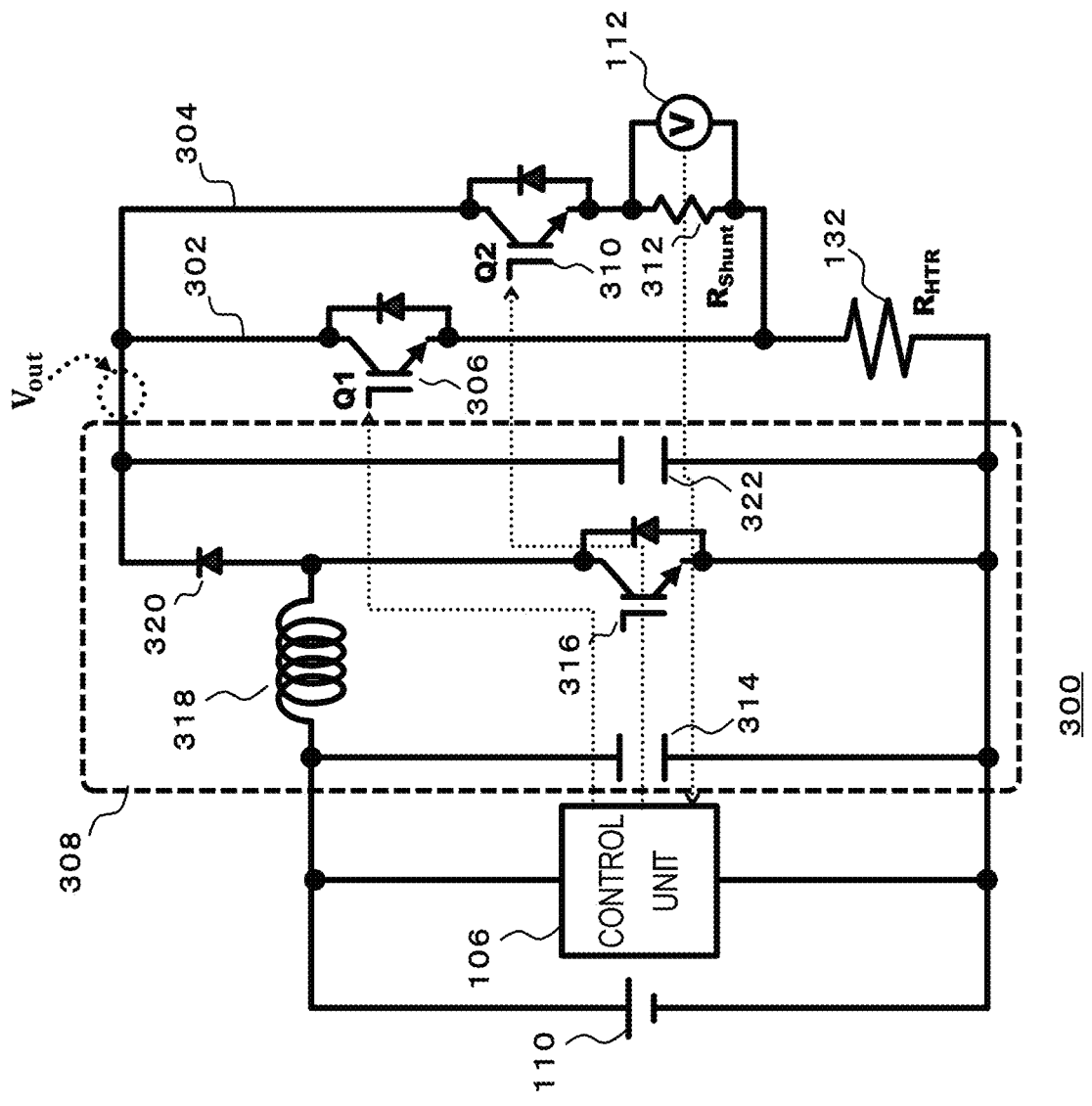
FIG. 3 is a diagram illustrating another exemplary circuit configuration of a portion of an aerosol generating apparatus according to the first embodiment of the present disclosure.

FIG. 3 is a diagram illustrating another exemplary circuit configuration of a portion of the aerosol generating apparatus 100A according to the first embodiment of the present disclosure.

In the same manner as in FIG. 2, a circuit 300 illustrated in FIG. 3 includes the power supply 110, the control unit 106, the element 112, the load 132, a first path 302, a second path 304, a switch Q1 including a first FET 306, a switch Q2 including a second FET 310, a constant voltage output circuit 308, and a resistor 312. Unlike FIG. 2, the constant voltage output circuit 308 is disposed on the power supply side of the first path 302. In this example, the constant voltage output circuit 308 is a switching regulator, and includes a capacitor 314, an FET 316, an inductor 318, a diode 320, and a capacitor 322. As in the case of FIG. 2, it is apparent to a person skilled in the art that the circuit illustrated in FIG. 3 operates to atomize the aerosol source when the first path 302 functions and to acquire a value related to a temperature of the load 132 when the second path 304 functions. Note that in the circuit illustrated in FIG. 3, the constant voltage output circuit 308 is a step-up type switching regulator (a so-called boost converter) that increases and outputs the input voltage, and alternatively may be a step-down type switching regulator (a so-called buck converter) that decreases and outputs the input voltage instead of the step-up type switching regulator or may be a step-up/step-down type switching regulator (buck/boost convertor) that can increase and decrease the input voltage.

Figure 4:
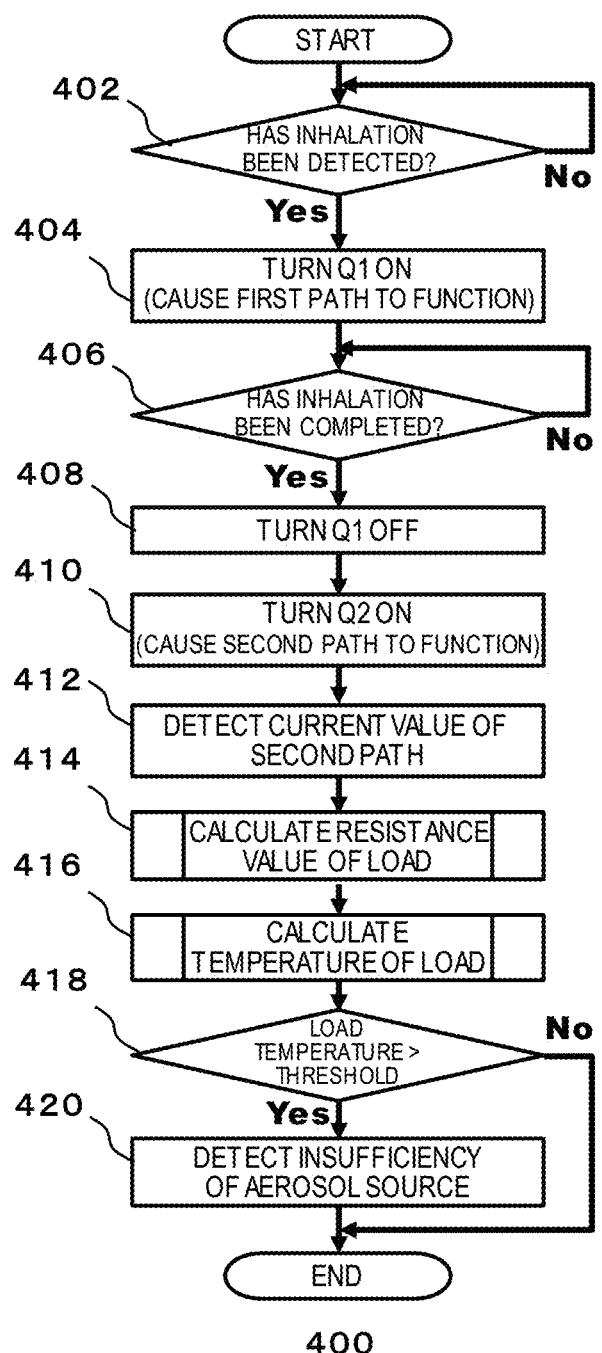
FIG. 4 is a flowchart of exemplary processing of detecting insufficiency of an aerosol source according to the first embodiment of the present disclosure.

FIG. 4 is a flowchart of exemplary processing of detecting insufficiency of the aerosol source according to an embodiment of the present disclosure. Here, all the steps will be described as being performed by the control unit 106. However, it should be noted that some of the steps may be performed by another component in the aerosol generating apparatus 100. Note that, although the present embodiment is described using the circuit 200 illustrated in FIG. 2 as an example, it is apparent to a person skilled in the art that the description can be made using the circuit 300 illustrated in FIG. 3 or a different circuit.

The process starts at step 402. In step 402, the control unit 106 determines whether the user's inhalation has been detected, on the basis of the information obtained from the pressure sensor, the flow sensor, and/or the like. For example, when the output values of these sensors successively change, the control unit 106 may determine that the user's inhalation has been detected. Alternatively, the control unit 106 may determine that the user's inhalation has been detected, on the basis of the fact that a button for starting generation of an aerosol has been pressed, etc.

When it is determined that the inhalation has been detected ("Yes" in step 402), the process proceeds to step 404. In step 404, the control unit 106 switches the switch Q1 to the on-state to cause the first path 202 to function.

The process proceeds to step 406, the control unit 106 determines whether the inhalation has been completed. When it is determined that the inhalation has been completed ("Yes" in step 406), the process proceeds to step 408.

In step 408, the control unit 106 switches the switch Q1 to the off-state. In step 410, the control unit 106 switches the switch Q2 to the on-state to cause the second path 204 to function.

The process proceeds to step 412, and the control unit 106 detects a current value of the second path 204 as described above, for example. In steps 414 and 416, the control unit 106 calculates each of a resistance value and temperature of the load 132 according to the method as described above, for example.

The process proceeds to step 418, and the control unit 106 determines whether the temperature of the load 132 exceeds a predetermined threshold. When it is determined that the load temperature exceeds the threshold ("Yes" in step 418), the process proceeds to step 420, and the control unit 106 determines that the aerosol source in the aerosol generating apparatus 100A is insufficient in quantity. On the other hand, when it is determined that the load temperature does not exceed the threshold ("No" in step 418), it is not determined that the aerosol source is insufficient in quantity.

It should be noted that the processing illustrated in FIG. 4 merely illustrates a typical flow for determining whether the aerosol source in the aerosol generating apparatus 100A is insufficient in quantity, and that a process of distinguishing between an insufficiency of the aerosol source in quantity in the storage 116, and an insufficiency of the aerosol source in quantity in the retention unit 130 is not illustrated in FIG. 4, where the process is particular to the present embodiment of the present disclosure.

In the present disclosure, the insufficiency of the aerosol source in the storage 116 means not only that the aerosol source has been completely depleted in the storage 116 but also that a sufficient quantity of the aerosol source cannot be supplied to the retention unit 130. In the present disclosure, the insufficiency of the aerosol source in the retention unit 130 means not only that the aerosol source has been completely depleted throughout the retention unit 130 but also that the aerosol source has been depleted in a part of the retention unit 130.

Figure 5A:
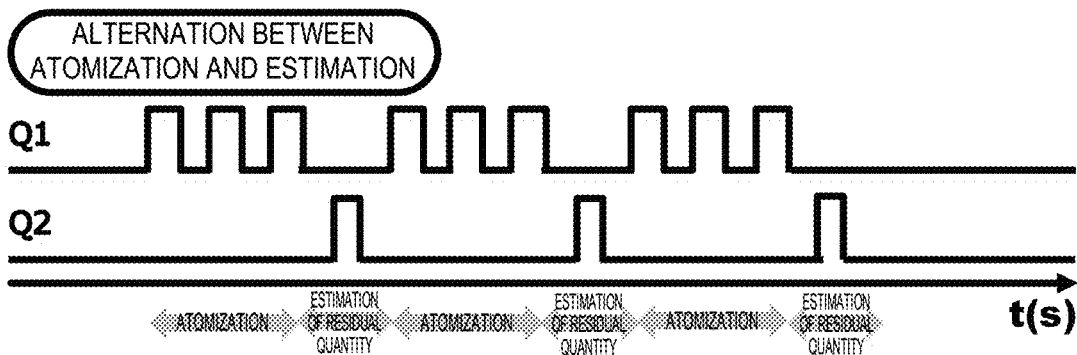
FIGS. 5A and 5B are timing charts illustrating examples of timings of switching of the switches Q1 and Q2 according to the first embodiment of the present disclosure.
Figure 5B:
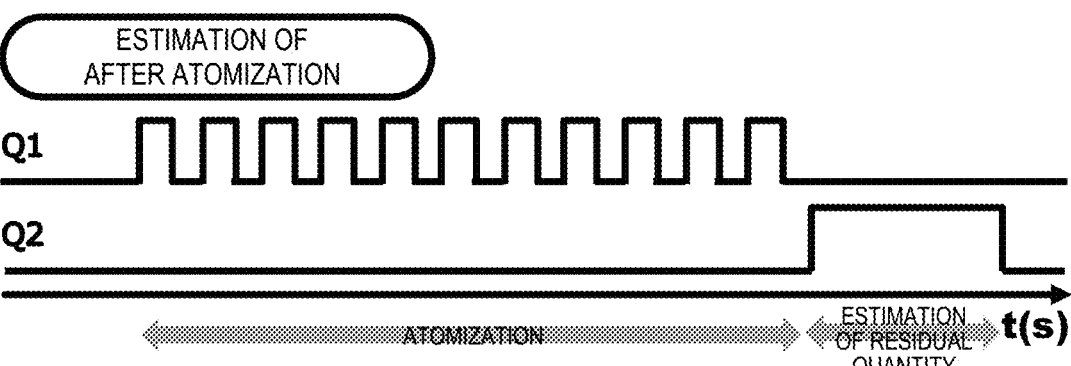

FIGS. 5A and 5B are timing charts illustrating examples of timings of switching of the switches Q1 and Q2 in the present embodiment. As illustrated in FIG. 5A, the control unit 106 may switch between the switch Q1 and the switch Q2 during the atomization of the aerosol source (during the user's inhalation). As illustrated in FIG. 5B, the control unit 106 may switch the switch Q1 to the off-state and the switch Q2 to the on-state after the atomization of the aerosol source has been completed (the user's inhalation has been completed).

Figure 6:
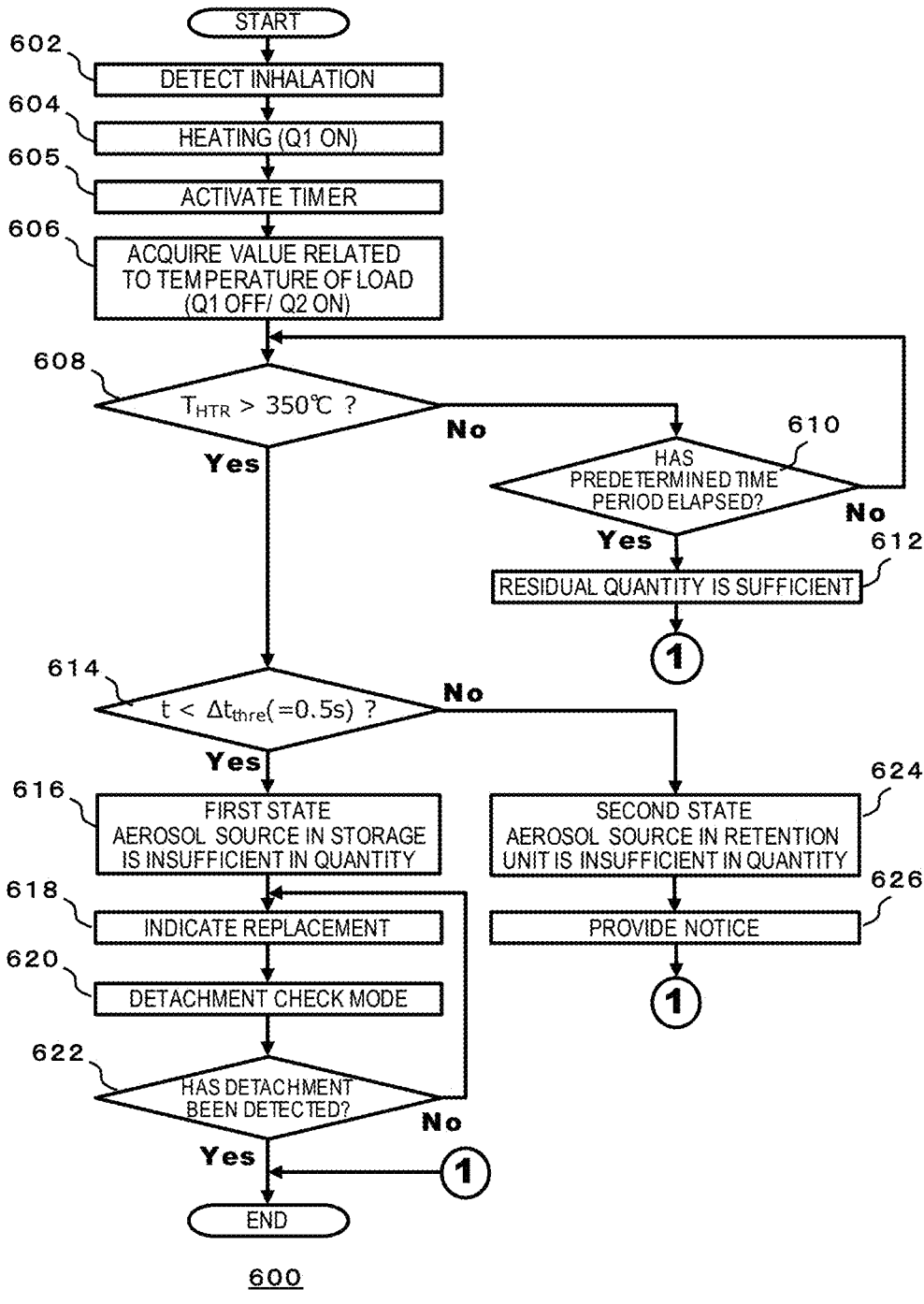
FIG. 6 is a flowchart illustrating processing of detecting an insufficiency of an aerosol source in the aerosol generating apparatus according to the first embodiment of the present disclosure.

FIG. 6 is a flowchart illustrating processing of detecting an insufficiency of the aerosol source in the aerosol generating apparatus 100A according to the present embodiment. In this example, as illustrated in FIG. 5A, it is assumed that the switching is performed between the switch Q1 and the switch Q2 during the user's inhalation. In addition, all the steps will be described as being performed by the control unit 106. However, it should be noted that some of the steps may be performed by another component in the aerosol generating apparatus 100.

The process in step 602 is the same as the process in step 402 in FIG. 4. When a predetermined condition is satisfied, the control unit 106 determines that the user's inhalation has started.

The process proceeds to step 604, and the control unit 106 switches the switch Q1 to the on-state to cause the first path 202 to function. Therefore, the electric power is supplied to the heater (or the load 132 in the heater), and the aerosol source in the retention unit 130 is heated to generate an aerosol. Furthermore, in step 605, the control unit 106 activates a timer (not illustrated). As another example, the timer may be activated not only when the switch Q1 is switched to the on-state but also when the switch Q2 is switched to the on-state in step 606 described later.

The process proceeds to step 606, and the control unit 106 switches the switch Q1 to the off-state and the switch Q2 to the on-state. It should be noted that in the example in FIG. 6, this process is performed during the user's inhalation. When the process in step 606 is performed, the second path 204 functions, and the element 112 acquires a value related to the temperature of the load 132 (for example, a value of the voltage applied to the resistor 212, a value of current flowing the resistor 212 and the load 132, and/or the like). The temperature of the load 132 is calculated based on the acquired value as described above.

When a residual quantity of the aerosol source is sufficient, the heat added to the load 132 in step 604 is used for generation of an aerosol by atomization of the aerosol source. Accordingly, the temperature of the load 132 does not substantially exceed a boiling point of the aerosol source or a temperature (for example, 200° C.) at which generation of an aerosol occurs by evaporation of the aerosol source. On the other hand, when the aerosol source in the storage 116 and/or the aerosol source in the retention unit 130 is insufficient in quantity, heating to the load 132 causes the complete or partial depletion of the aerosol source in the retention unit 130, resulting in increase in the temperature of the load 132.

The process proceeds to step 608, and the control unit 106 determines whether the temperature ($T_{HTR}$) of the load 132 exceeds a predetermined temperature (for example, 350° C.). In this example, the temperature of the load 132 is compared with a temperature threshold. In another embodiment, a resistance value or current value of the load 132 may be compared with a threshold of the resistance value or a threshold of the current value. In this case, the threshold of the resistance value, the threshold of the current value, or the like is set to an appropriate value so that it can be sufficiently determined that the aerosol source is insufficient in quantity.

When the temperature of the load 132 does not exceed the predetermined temperature ("No" in step 608), the process proceeds to step 610. In step 610, the control unit 106 determines whether a predetermined time period has elapsed, on the basis of a time indicated by the timer. When the predetermined time period has elapsed ("Yes" in step 610), the process proceeds to step 612. In step 612, the control unit 106 determines that a residual quantity of the aerosol source in the storage 116 and the retention unit 130 is sufficient, and the process ends. When the predetermined time period has not elapsed ("No" in step 610), the process returns to before step 608.

When the temperature of the load 132 exceeds the predetermined temperature ("Yes" in step 608), the process proceeds to step 614. In step 614, the control unit 106 determines whether a time period from the timer activation to a present time is less than a predetermined threshold $\Delta t_{thre}$ (for example, 0.5 seconds).

In the case where the timer is activated when the switch Q1 is switched to the on-state in step 605, the predetermined threshold $\Delta t_{thre}$ may be the sum of a first predetermined fixed value (for example, a predetermined time period during which the switch Q1 is in the on-state) and a second predetermined fixed value (for example, a time period less than or equal to a predetermined time period during which the switch Q2 is in the on-state). Alternatively, the predetermined threshold $\Delta t_{thre}$ may be the sum of an actually measured time period during which the switch Q1 is in the on-state, and the above-described second predetermined fixed value.

In the case where the timer is activated when the switch Q2 is switched to the on-state, the predetermined threshold $\Delta t_{thre}$ may be the above-described second predetermined fixed value.

When the case where the aerosol source of the storage 116 is insufficient in quantity is compared with the case where the storage 116 is capable of supplying the aerosol source while the aerosol source retained by the retention unit 130 is insufficient in quantity, a time period until the temperature of the load 132 reaches an unacceptable high temperature is shorter in the former case than in the latter case. This is because in the former case, since the aerosol source is not supplied to the retention unit 130, the electric power supplied to the load 132 is used for temperature rise of the load 132, whereas in the latter case, since the aerosol source can be supplied from the storage 116 to the retention unit 130, the electric power supplied to the load 132 can be also used to atomize the aerosol source.

When the time period from the timer activation to the present time is less than the predetermined threshold ("Yes" in step 614), the process proceeds to step 616. In step 616, the control unit 106 determines that the aerosol generating apparatus 100 is in the first state. Since in the first state, the aerosol source stored in the storage 116 is insufficient in quantity, the temperature of the load 132 exceeds a boiling point of the aerosol source or a temperature at which generation of an aerosol source occurs by evaporation of the aerosol source. On the other hand, when the time period from the timer activation to the present time is equal to or larger than the predetermined threshold ("No" in step 614), the process proceeds to step 624. In step 624, the control unit 106 determines that the aerosol generating apparatus 100 is in the second state. Since in the second state, the storage 116 is capable of supplying the aerosol source while the aerosol source retained by the retention unit 130 is insufficient in quantity, the temperature of the load 132 exceeds a boiling point of the aerosol source or a temperature at which generation of an aerosol source occurs by evaporation of the aerosol source. Thus, the control unit 106 can be configured to distinguish between the first state and the second state on the basis of a time period elapsed from when the first path 202 or the second path 204 functions to when a value related to the temperature of the load 132 reaches the threshold.

In the present disclosure, the insufficiency of the aerosol source in the first state means a state in which the aerosol source in the storage 116 is completely depleted, or a state in which a sufficient quantity of the aerosol source cannot be supplied to the retention unit 130 because the quantity of the aerosol source in the storage 116 is small. In addition, in the present disclosure, the insufficiency of the aerosol source in the second state means a state in which the storage 116 is capable of supplying the aerosol source while the aerosol source is completely depleted throughout the retention unit 130, or a state in which the aerosol source is depleted in a part of the retention unit 130. In both of the first state and the second state, a sufficient quantity of an aerosol cannot be generated.

After step 616, the process proceeds to step 618, and the control unit 106 uses the notifier 108 or the like to make the user to recognize that the aerosol generating apparatus 100 is in the first state and the storage 116 should be replaced (or the aerosol source in the storage 116 should be replenished). The process proceeds to step 620, and the control unit 106 shifts to a detachment check mode. The process proceeds to step 622, and the control unit 106 determines whether the detachment of the storage 116 (or the replenishment of the aerosol source) has been detected. When the detachment of the storage 116 has been detected ("Yes" in step 622), the process ends. Otherwise ("No" in step 622), the process returns to before step 618.

After step 624, the process proceeds to step 626, and the control unit 106 outputs a notice using the notifier 108 or the like to make the user to recognize that the aerosol generating apparatus 100 is in the second state. Then, the process ends.

As described above, according to the present embodiment, it is possible to distinguish between the first state of the aerosol generating apparatus 100A in which the aerosol source stored in the storage 116 is insufficient in quantity, and the second state in which the storage 116 is capable of supplying the aerosol source while the aerosol source retained by the retention unit 130 is insufficient in quantity, on the basis of a change in a value related to the temperature of the load 132 after the circuit 134 has functioned. Accordingly, it is possible to determine with high precision whether the aerosol source is completely depleted.

In addition, as described above, the timer may be activated when the switch Q1 is switched to the off-state, or may be activated when the switch Q2 is switched to the on-state. The control unit 106 can distinguish between the first state and the second state on the basis of a change in a value related to the temperature of the load 132 after functioning of the first path 202 or during functioning of the second path 204. Accordingly, in the configuration in which the first path 202 for generating an aerosol and the second path 204 for detecting the insufficiency of the aerosol source are alternately switched to the on-state, it is possible to distinguish between the first state and the second state.

In a variant of the embodiment in FIG. 6, the first state may be defined as a state in which the aerosol source stored in the storage 116 is insufficient in quantity, and therefore the temperature of the load 132 reaches a predetermined temperature below a boiling point of the aerosol source or a temperature at which the generation of an aerosol occurs by evaporation of the aerosol source earlier than in another state different from the first state and the second state. In addition, the second state may be defined as a state in which the storage 116 is capable of supplying the aerosol source while the aerosol source retained by the retention unit 130 is insufficient in quantity, and therefore the temperature of the load 132 reaches a predetermined temperature below a boiling point of the aerosol source or a temperature at which generation of an aerosol occurs by evaporation of the aerosol source earlier than in another state different from the first state and the second state. In these cases, as compared with the above-described embodiment in FIG. 6, the precision in detecting the insufficiency of the aerosol source is reduced, but earlier detection is possible.

As described above, in the embodiment in FIG. 6, the difference exists between the control (steps 618 to 622) to be performed in the first state in which the aerosol source stored in the storage 116 is insufficient in quantity, and the control (step 626) to be performed in the second state in which the storage 116 is capable of supplying the aerosol source while the aerosol source retained by the retention unit 130 is insufficient in quantity.

Figure 7:
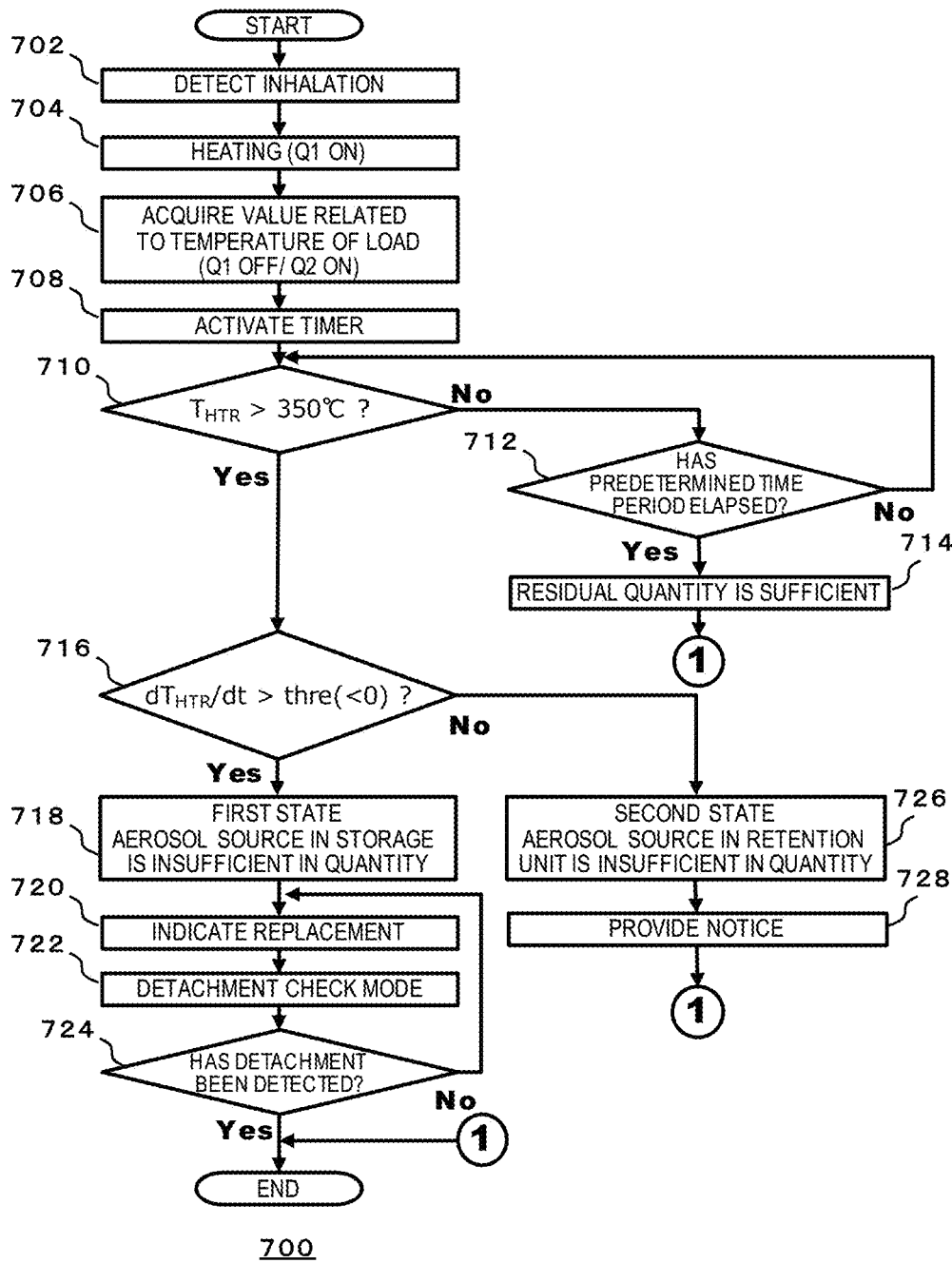
FIG. 7 is a flowchart illustrating processing of detecting the insufficiency of the aerosol source in the aerosol generating apparatus according to the first embodiment of the present disclosure.

FIG. 7 is a flowchart illustrating another processing of detecting the insufficiency of the aerosol source in the aerosol generating apparatus 100A according to the present embodiment. In this example, as illustrated in FIG. 5B, it is assumed that after the user's inhalation has been completed, the switch Q1 is switched to the off-state and the switch Q2 is switched to the on-state.

The process in step 702 is the same as the process in step 602 in FIG. 6.

The process proceeds to step 704, and the control unit 106 switches the switch Q1 to the on-state to cause the first path 202 to function. Accordingly, the electric power is supplied to the heater (the load 132), and the aerosol source in the retention unit 130 is heated to generate an aerosol.

The process proceeds to step 706, the control unit 106 switches the switch Q1 to the off-state and the switch Q2 to the on-state. It should be noted that in the example in FIG. 7, this process is performed after the user's inhalation has been completed. When the process in step 706 is performed, the second path 204 functions, the element 112 acquires a value related to the temperature of the load 132, and then the temperature of the load 132 is calculated based on the acquired value.

The process proceeds to step 708, and the control unit 106 activates the timer.

The process proceeds to step 710. The process in step 710 is the same as the process in step 608.

When the temperature of the load 132 does not exceed the predetermined temperature ("No" in step 710), the process proceeds to step 712. The processes in steps 712 and 714 are the same as the processes in steps 610 and 612.

When the temperature of the load 132 exceeds the predetermined temperature ("Yes" in step 710), the process proceeds to step 716. In step 716, the control unit 106 determines whether a time derivative of the temperature of the load 132 is larger than a predetermined threshold (for example, a value smaller than zero).

In the case where the aerosol source in the retention unit 130 becomes insufficient in quantity during the user's inhalation, when the case where the aerosol source of the storage 116 is insufficient in quantity is compared with the case where the storage 116 is capable of supplying the aerosol source while the aerosol source retained by the retention unit 130 is insufficient in quantity, the time derivative of the temperature of the load 132 after the completion of the user's inhalation is larger in the former case than in the latter case. This is because in the former case, since the aerosol source is not supplied to the retention unit 130 after the completion of the user's inhalation, the temperature of the load 132 is increased and stagnated, or continues to be gradually decreased, whereas in the latter case, since the aerosol source can be supplied from the storage 116 to the retention unit 130 after the completion of the user's inhalation, the temperature of the load 132 may decrease.

When the time derivative of the temperature of the load 132 is larger than the threshold ("Yes" in step 716), the process proceeds to step 718. In step 718, the control unit 106 determines that the aerosol generating apparatus 100A is in the first state in which the aerosol source stored in the storage 116 is insufficient in quantity. On the other hand, when the time derivative of the temperature of the load 132 is equal to or smaller than the threshold ("No" in step 716), the process proceeds to step 726. In step 726, the control unit 106 determines the aerosol generating apparatus 100A is in the second state in which the storage 116 is capable of supplying the aerosol source while the aerosol source retained by the retention unit 130 is insufficient in quantity.

The processes of steps 720 to 724 are the same as the processes in steps 618 to 622. The process in step 728 is the same as the process of step 626.

In the example in FIG. 7, the control unit 106 causes the second path 204 to function after the operation of the first path 202 has been completed. Accordingly, in a static state in which an aerosol is not generated, it is possible to distinguish with high precision between the first state and second state of the aerosol generating apparatus 100.

According to the example in FIG. 7, the control unit 106 can distinguish between the first state and the second state on the basis of a change in a value related to the temperature of the load 132 after the operation of the first path 202 has been completed or during functioning of the second path 204. Accordingly, in the configuration in which the first path 202 for generating an aerosol and the second path 204 for detecting the insufficiency of the aerosol source are in turn switched to the on-state, it is possible to distinguish between the first state and the second state.

Note that, in the example in FIG. 7, the control unit 106 may cause the second path 204 to function after a plurality of times of operations of the first path 202 have been completed. For example, after five on/off operations of the switch Q1 have been completed (after the completion of user's five inhalations), the switch Q2 may be switched to the on-state. In this case, as the number of operations or the integrated operation amount of the load 132 increases after the storage 116 has been replaced with a new storage 116 or after the aerosol source has been replenished in the storage 116, the control unit 106 may reduce the number of times of actuating the first path 202 before causing the second path 204 to function.

Similarly to the embodiment in FIG. 6, in the embodiment in FIG. 7 as well, the difference exists between the control (steps 720 to 724) to be performed in the first state and the control (step 728) to be performed in the second state.

Figure 8:
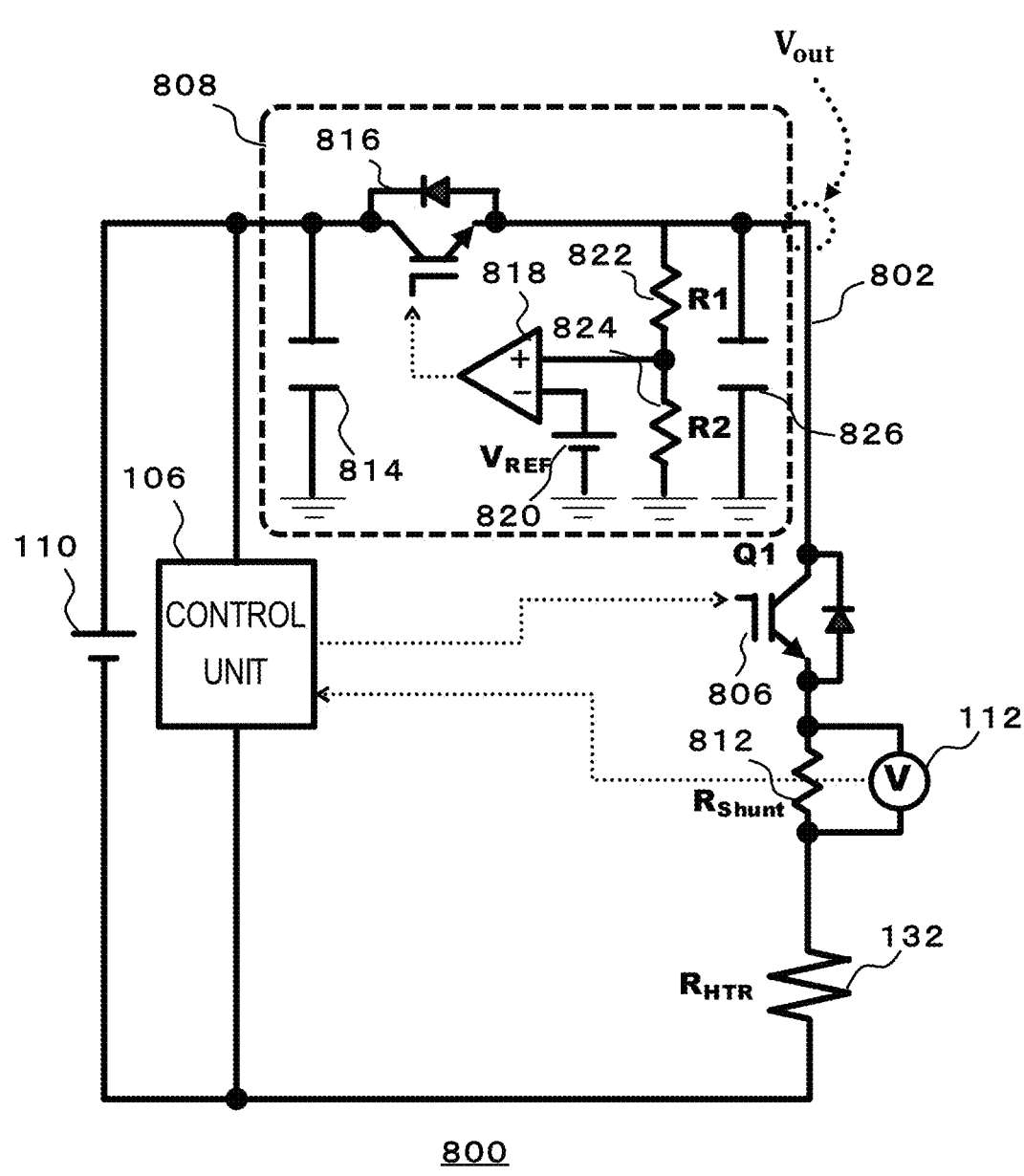
FIG. 8 is a diagram illustrating an exemplary circuit configuration of a portion of the aerosol generating apparatus according to the first embodiment of the present disclosure.

FIG. 8 is a diagram illustrating an exemplary circuit configuration of a portion of the aerosol generating apparatus 100A according to the first embodiment of the present disclosure.

A circuit 800 illustrated in FIG. 8 includes the power supply 110, the control unit 106, the element 112, the load 132, a single path 802, a switch Q1 including an FET 806, a constant voltage output circuit 808, and a resistor 812.

The circuit 134 may be configured to include the single path 802 as illustrated in FIG. 8. The path 802 is connected in series to the load 132. The path 802 may include the switch Q1 and the resistor 812. In this example, the circuit 134 may further include a device (not illustrated) configured to smooth the electric power to be supplied to the load 132.

This can reduce the influence of noise during the transition (turning on and turning off of the switch), noise caused by a surge current, or the like, thereby allowing for distinction between the first state and the second state with high precision.

As indicated by dotted-line arrows in FIG. 8, the control unit 106 can control the switch Q1, and can acquire a value detected by the element 112.

The control unit 106 switches the switch Q1 from the off-state to the on-state to cause the path 802 to function.

The path 802 is used for the atomization of the aerosol source. When the switch Q1 is switched to the on-state to cause the path 802 to function, the electric power is supplied to the load 132, and the load 132 is heated. The aerosol source retained by the retention unit 130 in the atomizer 118 is atomized through heating by the load 132, to generate an aerosol.

The path 802 is also used to acquire a value related to the temperature of the load 132. When the switch Q1 is in the on-state and the path 802 is functioning, the current flows through the constant voltage output circuit 808, the switch Q1, the resistor 812, and the load 132. As described above in connection with FIG. 2, when the element 112 is a voltage sensor, the temperature of the load 132 can be estimated using a value of the voltage applied to the resistor 812 as a value related to the temperature of the load 132. Similarly to the example in FIG. 2, a specific example of the element 112 is not limited to the voltage sensor, and may include a different element such as a current sensor (for example, a hall element).

The aerosol generating apparatus 100A with a configuration illustrated in FIG. 8 may further include a low-pass filter (not illustrated). A value (a current value, a voltage value, or the like) related to the temperature of the load 132, acquired using the element 112, may pass through the low-pass filter. In this case, the control unit 106 may acquire the value related to the temperature that has passed through the low-pass filter, and calculate the temperature of the load 132 using the acquired value.

As in the case of FIG. 2, the constant voltage output circuit 808 is illustrated as being an LDO regulator, and may include a capacitor 814, an FET 816, an error amplifier 818, a reference voltage source 820, resistors 822 and 824, and a capacitor 826. The configuration of the constant voltage output circuit 808 is merely one example, and various configurations are possible.

Figure 9:
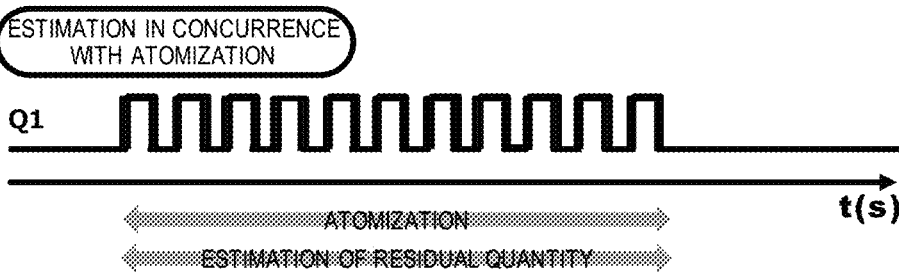
FIG. 9 is a timing chart illustrating timings of the atomization of the aerosol source and the residual quantity estimation of the aerosol source using the switch Q1 in the aerosol generating apparatus including the circuit in FIG. 8.

FIG. 9 is a timing chart illustrating timings of the atomization of the aerosol source and the residual quantity estimation of the aerosol source using the switch Q1, in the aerosol generating apparatus 100A including the circuit 800 in FIG. 8. Since the circuit in FIG. 8 has only the single path 802, the control unit 106 also detects whether the aerosol source is insufficient in quantity during the aerosol source is atomized (during the user is inhaling).

Figure 10:
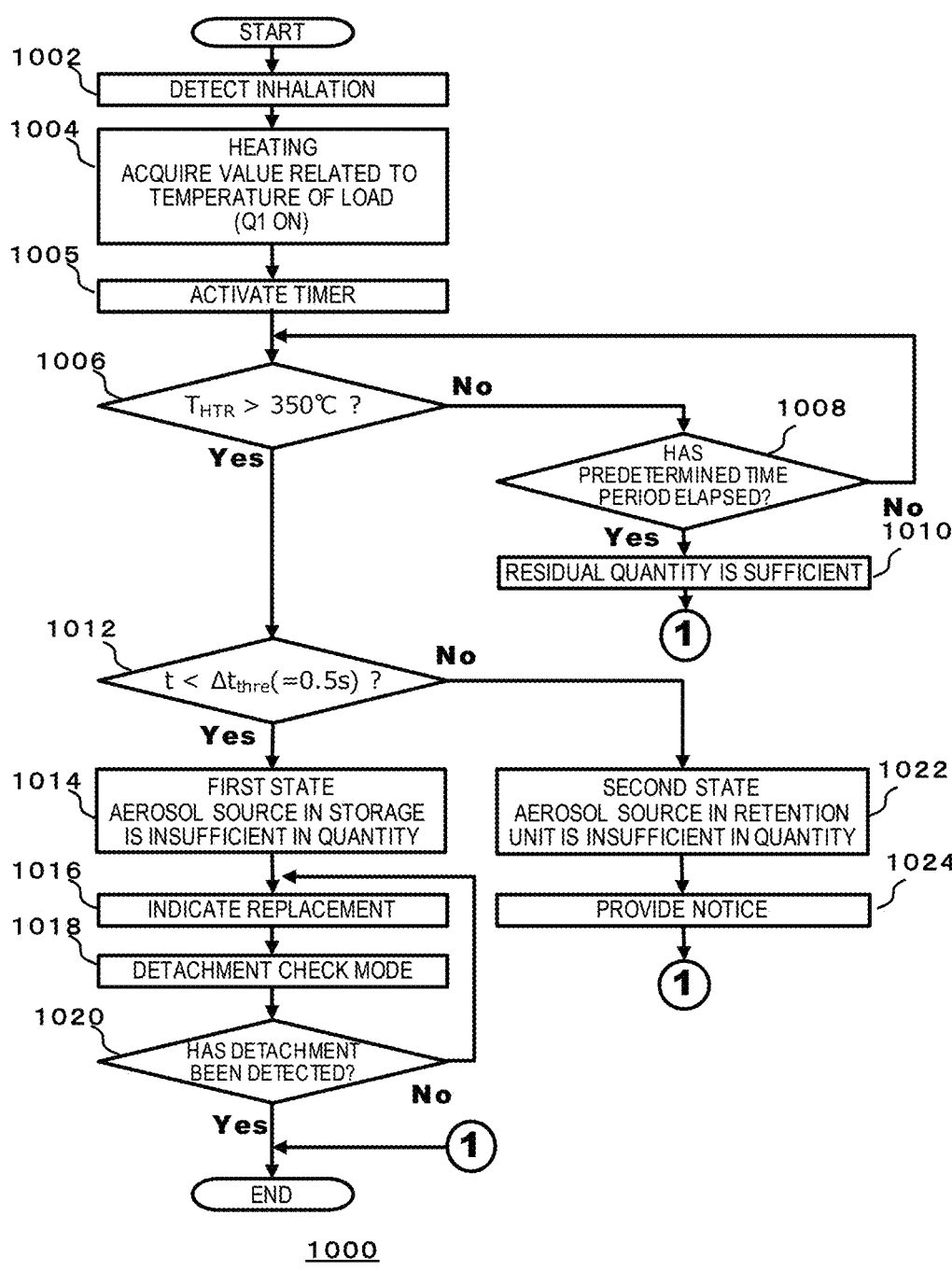
FIG. 10 is a flowchart illustrating processing of detecting an insufficiency of an aerosol source in the aerosol generating apparatus according to the first embodiment of the present disclosure.

FIG. 10 is a flowchart illustrating processing of detecting an insufficiency of an aerosol source in the aerosol generating apparatus 100A according to the embodiment. In this example, it is assumed that the aerosol generating apparatus 100A includes the circuit 800 illustrated in FIG. 8.

The process in step 1002 is the same as the process in step 602 in FIG. 6. When a predetermined condition is satisfied, the control unit 106 determines that the user's inhalation has started.

The process proceeds to step 1004, and the control unit 106 switches the switch Q1 to the on-state to cause the path 802 to function. Accordingly, the electric power is supplied to the heater (the load 132), and the aerosol source in the retention unit 130 is heated to generate an aerosol. The control unit 106 also acquires a value related to the temperature of the load 132 (for example, a value of the voltage to be applied to the resistor 812, a value of the current flowing through the load 132, or the like) using the element 112. As described above, the temperature of the load 132 is calculated based on the acquired value.

In step 1005, the control unit 106 activates a timer (not illustrated).

The processes of steps 1006 to 1024 are the same as the processes in steps 608 to 626.

Similarly to the embodiments in FIG. 6 and FIG. 7, in the embodiment in FIG. 10 as well, the difference exists between the control (steps 1016 to 1020) to be performed in the first state and the control (step 1024) to be performed in the second state.

Figure 11:
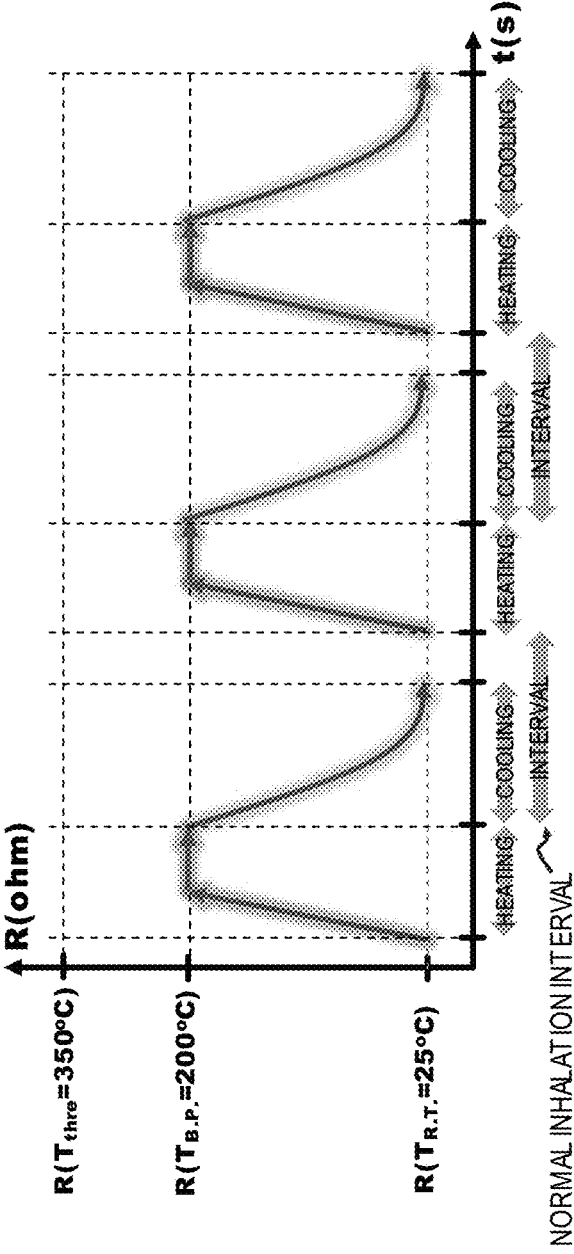
FIG. 11 is a graph schematically showing a time series change of a resistance value of a load when the user performs a normal inhalation using the aerosol generating apparatus.

FIG. 11 is a graph schematically showing a time series change of a resistance value of the load 132 when the user performs a normal inhalation using the aerosol generating apparatus 100A.

When the user's inhalation is detected, the electric power is supplied to the load 132, and the load 132 is heated. The temperature of the load 132 increases from a room temperature (for example, 25° C.) to a boiling point of the aerosol source or a temperature at which the generation of an aerosol occurs by evaporation of the aerosol source (for example, 200° C.). When a sufficient quantity of the aerosol source is present in the retention unit 130, the heat added to the load 132 is used for the atomization of the aerosol source, thereby allowing for stabilization of the temperature of the load 132 in the vicinity of the above-described temperature as shown in FIG. 11. When the user's inhalation has been completed, the electric power supply to the load 132 is stopped, and thus, the temperature of the load 132 decreases toward room temperature.

When the interval from when the user's inhalation has been completed till when a next inhalation starts is sufficiently long, the load 132 is cooled, and the temperature of the load 132 returns to the room temperature, as shown in FIG. 11. Based on the premise that a sufficient quantity of the aerosol source is stored in the storage 116, the sufficient quantity of the aerosol source is supplied from the storage 116 to the retention unit 130 before the next inhalation starts. Here, such an inhalation and such an interval are referred to as a "normal" inhalation and a "normal" interval, respectively.

The resistance value of the load 132 changes depending on the temperature of the load 132. In the example in FIG. 11, the resistance value of the load 132 increases from R ($T_{R.T.}$=25° C.) to R ($T_{B.P.}$=200° C.) while the temperature of the load 132 increases from the room temperature (25° C.) to the boiling point (200° C.) of the aerosol source. When the temperature of the load 132 reaches the boiling point of the aerosol source and the atomization of the aerosol source starts, the temperature of the load 132 is stabilized, and therefore the resistance value of the load 132 is also stabilized. During the period after the atomization of the aerosol source has been completed until the temperature of the load 132 decreases to the room temperature, the resistance value of the load 132 also decreases. As described above, in the example in FIG. 11, the normal inhalation is performed, and therefore the resistance value of the load 132 returns to R ($T_{R.T.}$=25° C.) when the next inhalation starts.

In the present disclosure, the influence of a change in the resistance value of the load 132 due to heating to the load 132 in a previous inhalation on the resistance value of the load 132 in the next inhalation is referred to as a "heat history" of the load. In the example in FIG. 11, since such influence does not occur, the heat history regarding the resistance value of the load 132 does not remain.

Figure 12A:
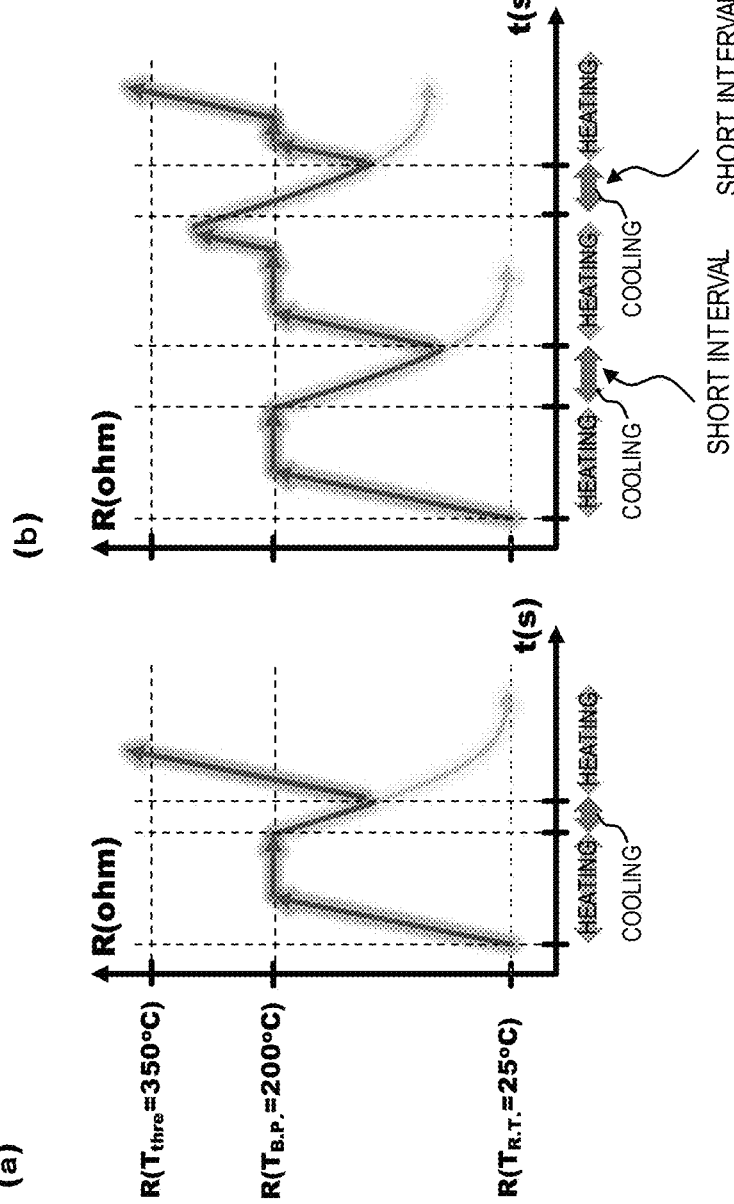
FIG. 12A is a graph schematically showing a time series change of a resistance value of the load when an interval from when the user's inhalation has been completed to when a next inhalation starts is shorter than a normal interval.

FIG. 12A is a graph schematically showing a time series change of a resistance value of the load 132 when the interval from when the user's inhalation has been completed till when a next inhalation starts is shorter than the normal interval.

When the interval is short, the next inhalation starts before the temperature of the load 132 returns to the room temperature, and the load 132 is heated again. FIG. 12A(a) is a graph representing such a case. In FIG. 12A(a), a situation from the start to the end of a first inhalation is similar to that of the normal inhalation in FIG. 11. When the first inhalation has been completed, the temperature of the load 132 decreases, and the resistance value of the load 132 also decreases correspondingly. However, since the interval from the end of the first inhalation to the start of a second inhalation is short, the temperature of the load 132 is higher than the room temperature at the start of the second inhalation, and therefore the resistance value of the load 132 is also larger than the resistance value R ($T_{R.T.}$=25° C.) at the room temperature. That is, unlike the example in FIG. 11, in the example in FIG. 12A, the heat history remains in the load 132 at the start of the second inhalation. Therefore, when the load 132 is heated due to the second inhalation, the aerosol source in the storage 116 and the retention unit 130 is insufficient in quantity, and thus, the resistance value of the load 132 may increase beyond R ($T_{B.P.}$=200° C.).

FIG. 12A(b) is a graph showing a time series change of a resistance value of the load 132 when the inhalation in the situation shown in FIG. 12A(a) is repeated. Since the interval from the end of the first inhalation to the start of the second interval is short, the resistance value of the load 132 at the start of the second inhalation is larger than the resistance value R ($T_{R.T.}$=25° C.) at the room temperature. In addition, since this interval is short, a sufficient quantity of the aerosol source cannot be supplied from the storage 116 to the retention unit 130. Accordingly, at the start of the second inhalation, the quantity of the aerosol source in the retention unit 130 may be smaller than that in the case where the interval has a sufficient length. Since the heat history of the load 132 thus remains and the quantity of the aerosol source in the retention unit 130 is small, after the load 132 is heated during the second inhalation to reach a state in which an aerosol is stably generated, the aerosol source in the retention unit 130 becomes insufficient in quantity, and thereby, the temperature of the load 132 may exceed the boiling point of the aerosol source as shown in the figure. Accordingly, the resistance value of the load 132 may also reach a value larger than R ($T_{B.P.}$=200° C.). When such a behavior is repeated, the temperature of the load 132 may reach a threshold (for example, 350° C.) shown in the embodiments described in connection with FIG. 6, FIG. 7 and FIG. 10.

The inventors of the present application have invented the technique in which the control of the aerosol generating apparatus 100A can be more appropriately performed when the aerosol source is insufficient in quantity by correcting, based on the heat history of the load 132, the condition including a threshold (for example, $\Delta t_{thre}$ in step 614) that is used to distinguish between the first state and the second state in the embodiments described in connection with FIG. 6, FIG. 7, and FIG. 10. The technique will be described below.

Figure 12B:
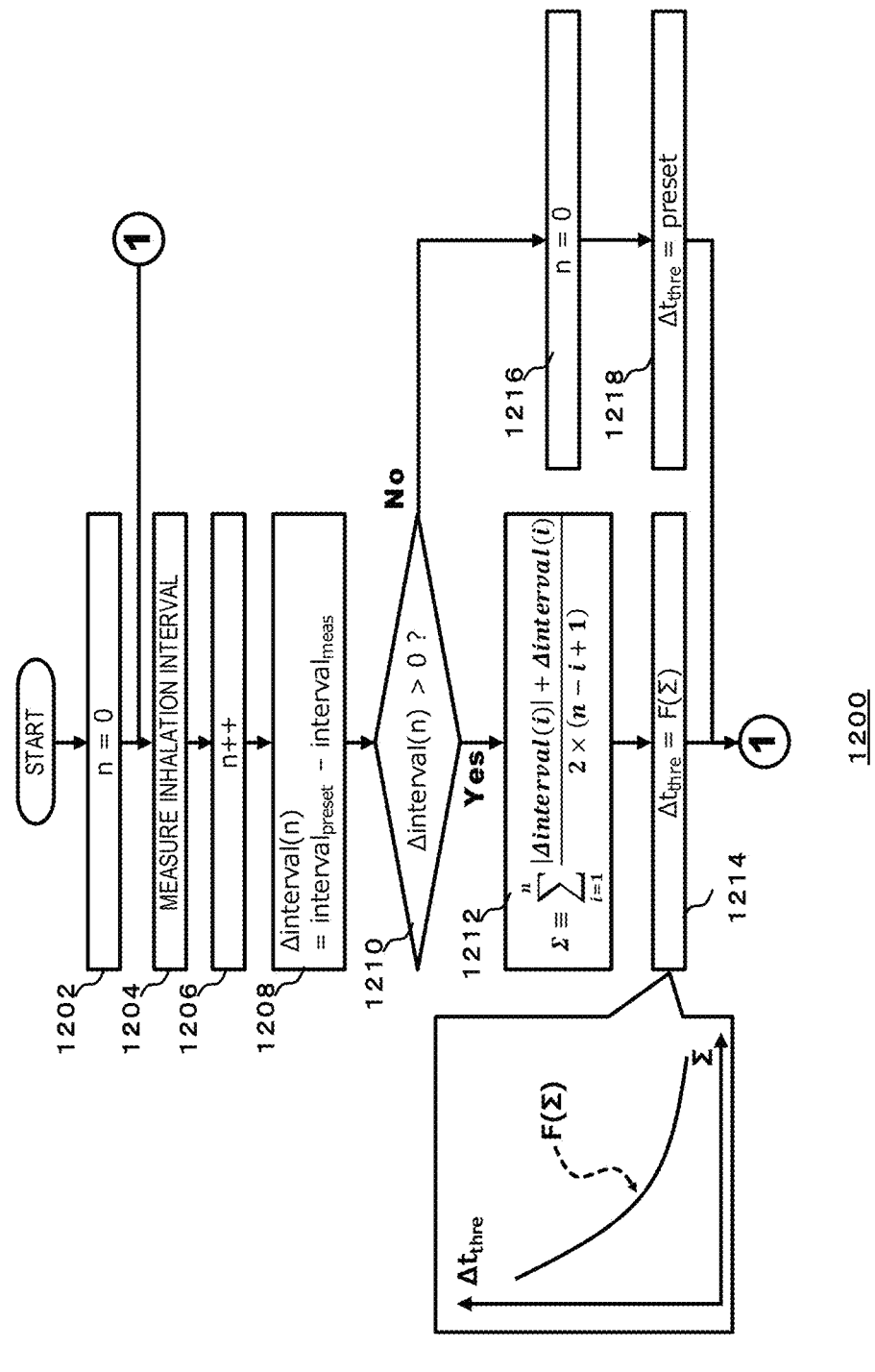
FIG. 12B is a flowchart illustrating processing of correcting the condition for distinguishing between the first state and the second state in the case where the user's inhalation is performed at a short interval, according to the first embodiment of the present disclosure.

FIG. 12B is a flowchart illustrating processing of correcting the condition for distinguishing between the first state and the second state in the case where the user's inhalation is performed at a short interval, according to the embodiment of the present disclosure.

The process starts at step 1202, and the control unit 106 sets a counter n to zero.

The process proceeds to step 1204, and the control unit 106 measures an inhalation interval (interval$_{meas}$) from the end time of the previous inhalation to the start time of the present inhalation.

The process proceeds to step 1206, and the control unit 106 increments a value of the counter n.

The process proceeds to step 1208, and the control unit 106 calculates a value (Δinterval(n)) obtained by subtracting interval$_{meas}$ measured in step 1204 from a value of a preset interval (interval$_{preset}$). The value of the interval$_{preset}$ may be a time period (for example, one second) during which the temperature of the load 132 returns from the boiling point of the aerosol source to the room temperature in the case of the normal inhalation, and may be a time period during which a sufficient quantity of the aerosol source is supplied from the storage 116 to the retention unit 130 after the previous inhalation has been completed.

The process proceeds to step 1210, and the control unit 106 determines whether Δinterval(n) calculated in step 1208 is larger than zero.

In FIG. 12B, when Δinterval(n) is equal to or smaller than zero (interval$_{meas}$ is equal to or larger than interval$_{preset}$) ("No" in step 1210), the process proceeds to step 1216. However, the process may return to the step prior to step 1204, and the processing from step 1204 to step 1210 may be repeated a predetermined number of times.

When Δinterval(n) is larger than zero (interval$_{meas}$ is smaller than interval$_{preset}$) ("Yes" in step 1210), the process proceeds to step 1212. In step 1212, the control unit 106 obtains a value Σ by integrating the previously calculated Δinterval(n). The calculation formula shown in step 1210 is merely one example. The process in step 1212 can be performed to make an influence of an old heat history included in the heat histories of the load 132 on the above-described condition (the condition for distinguishing between the first state and the second state), smaller than an influence of a new heat history included in the heat histories of the load 132 on the condition. Thus, even when a plurality of heat histories are accumulated, it is possible to distinguish between the first state and the second state with high precision. It is apparent to a person skilled in the art that various calculations may be performed in step 1212.

The process proceeds to step 1214, and the control unit 106 obtains the above-described condition (for example, Δt$_{thre}$) based on the integration value Σ obtained in step 1212 and a predetermined function. FIG. 12B shows an example of the predetermined function F(Σ) on the side of step 1214. Thus, in step 1214, as the integration value Σ is larger (as the inhalation interval is smaller), Δt$_{thre}$ may be preset smaller. Accordingly, the above-described condition is corrected to reduce the possibility that it is determined that the first state has occurred as the time interval from when a request for generation of an aerosol (the user's inhalation, a press of a predetermined button, or the like) has been completed to when the next request starts is shorter.

On the other hand, when Δinterval(n) is equal to or smaller than zero (interval meas is equal to or larger than interval$_{preset}$) ("No" in step 1210), the process proceeds to step 1216. In step 1216, the control unit 106 resets the counter n. Furthermore, the process proceeds to step 1218, and Δt$_{thre}$ is set to a predetermined value. That is, when the inhalation interval is sufficiently large, the condition used to distinguish between the first state and the second state are not corrected.

As described above, according to the present embodiment, the control unit 106 is operative to correct the condition for distinguishing between the first state and the second state on the basis of the heat history of the load 132 when the circuit 134 has functioned. Accordingly, even when the heat history of the load 132 remains, it is possible to distinguish between the first state and the second state with high precision.

According to the present embodiment, the control unit 106 acquires a time series change of a request for generation of an aerosol based on the request, and is operative to correct the condition for distinguishing between the first state and the second state based on the heat history of the load 132 derived from the time series change of the request. Accordingly, even when non-normal inhalation is performed, it is possible to distinguish between the first state and the second state with high precision.

Although problems similar to those in the examples in FIG. 12A(a) and FIG. 12A(b) may occur even in the case where the user's inhalation time period is long, and even in the case where the inhalation time period is long and the interval has a normal length, such problems can be solved by the present embodiment. That is, even when a time series change of a request for generation of an aerosol occurs by the inhalation performed over a time period longer than a normal time period, it is possible to correct the condition for distinguishing between the first state and the second state on the basis of the heat history of the load 132 derived from the change.

Figure 13A:
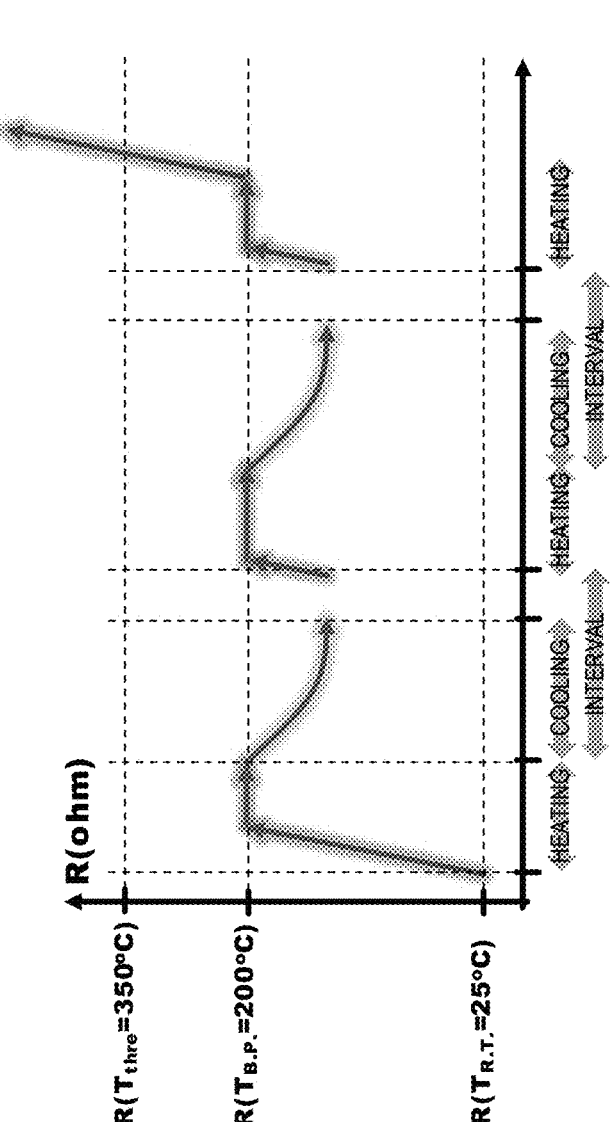

FIG. 13A is a graph schematically showing a time series change of a resistance value of the load 132 when a time period required for cooling the load 132 becomes longer than that in the normal case due to degradation of the load 132 and the like.

When the time period required for cooling the load 132 becomes longer, the next inhalation may start before the temperature of the load 132 returns to the room temperature even when the inhalation is performed at the normal interval. The graph in FIG. 13A shows such a situation. In FIG. 13A, a situation from the start to the end of a first inhalation is similar to that of the normal inhalation in FIG. 11. When the first inhalation has been completed, the temperature of the load 132 decreases, and the resistance value of the load 132 also decreases correspondingly. However, since the rate at which the temperature of the load 132 decreases is slow, the temperature of the load 132 is higher than the room temperature at the start of the second inhalation. Therefore, the resistance value of the load 132 is also larger than the resistance value R (T$_{R.T.}$=25° C.) at the room temperature. That is, unlike the example in FIG. 11, in the example in FIG. 13A, the heat history remains in the load 132 at the start of the second inhalation. Thus, when the load 132 is heated due to the second inhalation, the resistance value of the load 132 reaches R (T$_{B.P.}$=200° C.) rapidly. Therefore, a larger quantity of the aerosol source is heated, and thereby, a larger quantity of an aerosol can be generated. Accordingly, the aerosol source in the retention unit 130 tends to be insufficient in quantity. When such a behavior is repeated, the temperature of the load 132 may reach a threshold (for example, 350° C.) shown in the embodiments described in connection with FIG. 6, FIG. 7 and FIG. 10.

The inventors of the present application have invented the technique in which the control of the aerosol generating apparatus 100 can be more appropriately performed when the aerosol source is insufficient in quantity by correcting, based on the heat history of the load 132, the condition including a threshold (for example, $\Delta t_{thre}$ in step 614) that is used to distinguish between the first state and the second state in the embodiments described in connection with FIG. 6, FIG. 7, and FIG. 10, even in such a case. The technique will be described below.

Figure 13B:
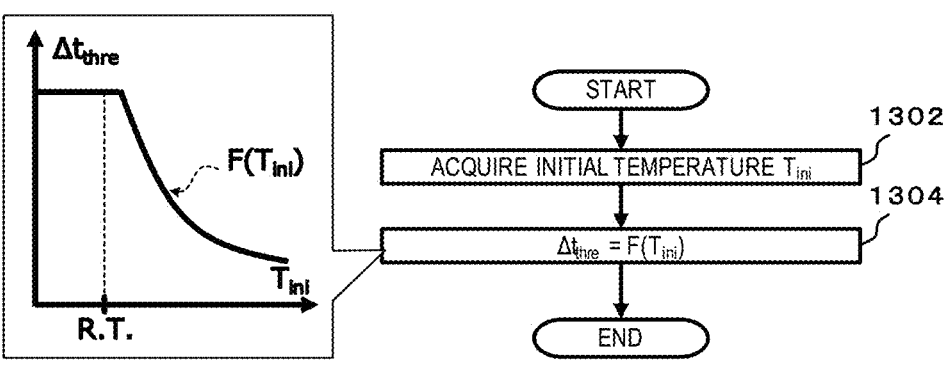
FIG. 13B is a flowchart illustrating processing of correcting the condition for distinguishing between the first state and the second state in the case where a time period required for cooling the load is longer than that in a normal case, according to the first embodiment of the present disclosure.

FIG. 13B is a flowchart illustrating processing of correcting the condition for distinguishing between the first state and the second state in the case where a time period required for cooling the load 132 is longer than that in a normal case, according to the embodiment of the present disclosure.

The process starts at step 1302, and the control unit 106 acquires an initial temperature $T_{ini}$ of the load 132 when the user's inhalation starts and the circuit 134 of the aerosol generating apparatus 100A has functioned.

The process proceeds to step 1304, and the control unit 106 obtains the above-described condition (for example, $\Delta t_{thre}$) based on the initial temperature $T_{ini}$ and a predetermined function. FIG. 13B shows an example of the predetermined function $F(T_{ini})$ on the side of step 1304. Thus, in step 1304, the processing may be performed to reduce $\Delta t_{thre}$ as the temperature of the load 132 when the circuit 134 of the aerosol generating apparatus 100 has functioned is higher. Accordingly, according to the present embodiment, the control unit 106 is operative to correct the above-described condition to reduce the possibility that it is determined that the first state has occurred, as the temperature of the load 132 when the circuit 134 has functioned is higher.

In the above description, the first embodiment of the present disclosure has been described as an aerosol generating apparatus and a method of actuating the aerosol generating apparatus. Nonetheless, it will be appreciated that the present disclosure, when being executed by a processor, can be implemented as a program that causes the processor to perform the method or as a computer readable storage medium storing the program.

Second Embodiment

An aerosol generating apparatus 100 according to the embodiment of the present disclosure may undergo temporary insufficiency of an aerosol source in a retention unit 130 when the inhalation is performed at an interval shorter than that in the normal inhalation (for example, the interval shorter than a time period required for supplying a sufficient quantity of an aerosol from a storage 116 to the retention unit 130) even if a sufficient quantity of the aerosol source is stored in the storage 116. A similar problem may occur even when an inhalation capacity of a single inhalation is larger than that of the normal inhalation. The similar problem may occur even when an inhalation time period of a single inhalation is longer than that of the normal inhalation. These are merely examples of inhalation that may cause the above-described problem. A person skilled in the art will understand that the similar problem may occur due to an unexpected inhalation pattern having various characteristics. The second embodiment of the present disclosure is to solve the above-described problem.

A basic configuration of the aerosol generating apparatus 100 according to the present embodiment is similar to a configuration of the aerosol generating apparatus 100 illustrated in each of FIG. 1A and FIG. 1B.

The aerosol generating apparatus 100 according to the present embodiment may include a supplier capable of adjusting at least one of a quantity and a rate of the aerosol source to be supplied from the storage 116 to the retention unit 130. The supplier may be controlled by a control unit 106. The supplier may be achieved by various configurations including a pump disposed between the storage 116 and the retention unit 130, and a mechanism configured to control an opening to the atomizer 118 of the storage 116.

The aerosol generating apparatus 100 according to the present embodiment may include a temperature adjuster capable of adjusting a temperature of the aerosol source. The temperature adjuster may be controlled by the control unit 106. The temperature adjuster can be achieved by various configurations and arrangements.

The aerosol generating apparatus 100 according to the present embodiment may include a changing unit capable of changing an air-flow resistance in the aerosol generating apparatus 100. The changing unit may be controlled by the control unit 106. The changing unit can be achieved by various configurations and arrangements.

The aerosol generating apparatus 100 according to the present embodiment may also include a requesting unit that outputs a request for generation of an aerosol. The requesting unit may be controlled by the control unit 106. The requesting unit can be achieved by various configurations and arrangements.

Figure 14:
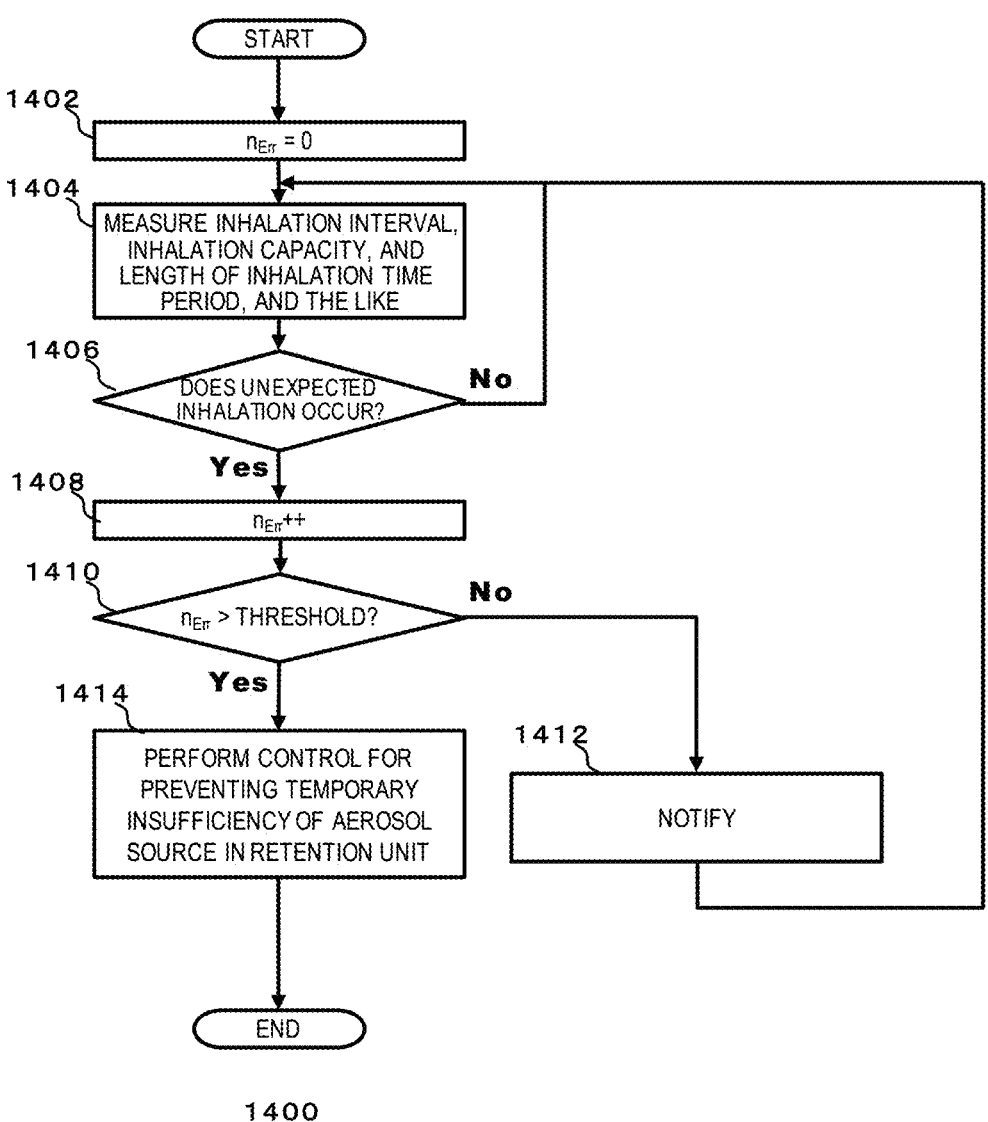
FIG. 14 is a flowchart illustrating processing of suppressing a temporary insufficiency of an aerosol source in a retention unit in an aerosol generating apparatus according to a second embodiment of the present disclosure.

FIG. 14 is a flowchart illustrating processing of suppressing a temporary insufficiency of an aerosol source in the retention unit 130 in the aerosol generating apparatus 100 according to the present embodiment.

The process starts at step 1402. When the process starts, the control unit 106 sets a counter $n_{err}$ to zero. A value of the counter $n_{err}$ may indicate the number of times that unexpected inhalation has been detected.

The process proceeds to step 1404, and the control unit 106 measures an interval of the inhalation, the inhalation capacity, a length of the inhalation time period, and the like. These are merely examples of parameters that may be measured in step 1404. It should be understood by a person skilled in the art that the present embodiment can be implemented by, in step 1404, measuring various parameters helping to detect an unexpected inhalation.

The process proceeds to step 1406, and the control unit 106 determines whether the inhalation performed presently is an inhalation having an unexpected characteristic when the parameter measured in step 1404 is compared with a corresponding parameter in the normal inhalation. For example, when the measured inhalation interval is shorter than a predetermined threshold, the control unit 106 may determine that the present inhalation is an unexpected inhalation. In another example, when the measured inhalation capacity exceeds a predetermined threshold, the control unit 106 may determine that the present inhalation is an unexpected inhalation. In another example, when the length of the measured inhalation time period is longer than the predetermined threshold, the control unit 106 may determine that the current inhalation is an unexpected inhalation. Alternatively, the control unit 106 may determine whether the present inhalation can cause a state in which the storage 116 is capable of supplying the aerosol source while the aerosol source retained by the retention unit 130 is insufficient in quantity (for example, the second state in the first embodiment) using the technique described in connection with FIG. 6, FIG. 7, FIG. 10, FIG. 12B and FIG. 13B in relation to the first embodiment. For example, as described in relation to the first embodiment, the control unit 106 may perform the determination in step 1406 based on a change in the temperature of the load 132 after causing the circuit 134 to function. Alternatively, as described in relation to the first embodiment, the control unit 106 may perform the determination in step 1406 based on a time series change of the request issued from the requesting unit.

When the present inhalation is not an unexpected inhalation ("No" in step 1406), the process returns to before step 1404. Alternatively, the process may end.

The case where the present inhalation is an unexpected inhalation ("Yes" in step 1406) indicates detection of a state in which the storage 116 is capable of supplying the aerosol source while the aerosol source retained by the retention unit 130 may be insufficient in quantity (more specifically, a dry state in which the temperature of the load 132 exceeds a boiling point of the aerosol source due to such a insufficiency of the aerosol source in the retention unit 130 or a sign of such a dry state). The process proceeds to step 1408, and the control unit 106 increments a value of the counter $n_{err}$.

The process proceeds to step 1410, and the control unit 106 determines whether the value of the counter $n_{err}$ exceeds a predetermined threshold.

When the value of the counter $n_{err}$ exceeds the predetermined threshold ("Yes" in step 1410), the process proceeds to step 1414. In step 1414, the control unit 106 performs the control to suppress the temporary insufficiency of the aerosol source in the retention unit 130.

In step 1414, the control unit 106 may perform the control to increase a retaining quantity of the aerosol source in the retention unit 130 or the control to improve the possibility of increasing the retaining quantity, at at least one of a time of starting the power supply from the power supply 110 to the load 132 and a time of completing the power supply from the power supply 110 to the load 132. This can suppress an occurrence or reoccurrence of the temporary drying in the retention unit 130.

As an example, in step 1414, the control unit 106 may perform the control to make the interval from the completion of generation of an aerosol to the start of subsequent generation of an aerosol, longer than the previous interval. This can inhibit generation of an aerosol during the extended interval, and can ensure the time period for supplying the aerosol source from the storage 116 to the retention unit 130. Accordingly, this can suppress an occurrence or reoccurrence of the temporary drying in the retention unit 130. In this example, the control unit 106 may correct the length of the interval on the basis of at least one of the viscosity of the aerosol source, the residual quantity of the aerosol source, the electric resistance value of the load 132, and the temperature of the power supply 110. This can prevent the interval from being excessively increased, and can suppress degradation of the user experience.

As an example, in step 1414, the control unit 106 may control the above-described supplier to increase at least one of the quantity and rate of the aerosol source to be supplied from the storage 116 to the retention unit 130. This can suppress an occurrence or reoccurrence of the temporary drying in the retention unit 130 without causing inconvenience to the user.

As an example, in step 1414, the control unit 106 may control the circuit to reduce the quantity of the generated aerosol.

As an example, in step 1414, the control unit 106 may control the above-described temperature adjuster to heat the aerosol source. A typical liquid aerosol source has such property that the viscosity of the aerosol source decreases when the temperature of the aerosol source itself increases. That is, when the aerosol source is heated at a temperature that does not cause the generation of the aerosol source, capillary effect leads to an increase in at least one of the quantity and rate of the aerosol source to be supplied from the storage 116 to the retention unit 130. The control unit 106 may also control the temperature adjuster to heat the aerosol source during an aerosol is not generated by the load 132. This causes supply of the aerosol source from the storage 116 to the retention unit 130 mainly when the inhalation is not performed, and therefore it is possible to easily obtain the heating effect. The control unit 106 may also use the load 132 as the temperature adjuster. This enables the simplification of the structure and the cost reduction without providing another heater for heating.

As an example, in step 1414, the control unit 106 may control the above-described changing unit to increase an air-flow resistance in the aerosol generating apparatus 100.

As an example, the control unit 106 may control the circuit 134 in accordance with the correlation in which as the request issued from the above-described requesting unit becomes larger (for example, an air pressure change detected in terms of the inhalation becomes larger), the quantity of the generated aerosol is increased. In step 1414, the control unit 106 may correct the correlation to reduce the quantity of the generated aerosol corresponding to the magnitude of the request.

As an example, the control unit 106 may be configured to perform a first mode of performing the control to make the interval from the completion of generation of an aerosol to the start of subsequent generation of an aerosol, longer than the previous interval, and to perform a second mode of performing the control to increase a retaining quantity of the aerosol source in the retention unit 130 or the control to improve the possibility of increasing the retaining quantity without performing the control of the interval, at at least one of a time of starting the power supply from the power supply 110 to the load 132 and a time of completing the power supply from the power supply 110 to the load 132. In step 1414, the control unit 106 may perform the second mode in preference to the first mode. This can an occurrence or reoccurrence of the temporary drying in the retention unit 130 without causing inconvenience to the user.

The control unit 106 may also perform the first mode upon detection of a dry state or sign of a dry state of the retention unit 130 after the second mode has been performed. Thus, this makes it possible both to ensure the convenience of the user and to suppress an occurrence or reoccurrence of the temporary drying in the retention unit 130, because the control of the interval is performed for the first time when the temporary drying in the retention unit 130 cannot be suppressed by means other than the control, which could impair the convenience of the user.

When the processing 1400 illustrated in FIG. 14 is performed a plurality of times, the control unit 106 may select the process to be performed in step 1414 from the above-described various processes each time. For example, among processes that may be performed in step 1414, the process with a small burden of the user may be preferentially performed. When an occurrence or reoccurrence of the temporary drying in the retention unit 130 cannot be suppressed even when such a process is performed, the process with a larger burden of the user may be performed.

When the value of the counter $n_{err}$ does not exceed the predetermined threshold ("No" in step 1410), the process proceeds to step 1412. In step 1412, the control unit 106 outputs a notice to the user. It is desirable that the notice allows the user to easily understand that a sufficient quantity of an aerosol may be no longer generated due to the influence of the present inhalation. For example, the control unit 106 may cause the notifier 108 to function on the basis of the fact that the above-described dry state or the sign of the dry state has been detected. When the notifier 108 is a light emitting element such as an LED, a display, a speaker, a vibrator, or the like, the control unit 106 may cause the notifier 108 to perform the operation such as light emission, display, sound production, or vibration. In this way, the user may refrain from inhalation, resulting that the time period for supplying the aerosol source from the storage 116 to the retention unit 130 can be ensured. Accordingly, the reoccurrence of the temporary drying or drying in the retention unit 130 can be suppressed.

As an example, in step 1412, the control unit 106 may perform the control to make the next interval longer than the previous interval upon detection of a dry state or a sign of a dry state after causing the notifier 108 to function one or more times. This can suppress an occurrence or reoccurrence of the temporary drying in the retention unit 130 without causing inconvenience to the user from the beginning. In this example, the control unit 106 may correct the length of the interval based on at least one of the viscosity of the aerosol source, the residual quantity of the aerosol source, the electric resistance value of the load 132, and the temperature of the power supply 110.

In an embodiment, the control unit 106 may perform the control to suppress generation of an aerosol or the control to improve the possibility of suppressing generation of an aerosol, in the interval corresponding to the time period until when the aerosol source with a quantity greater than or equal to a quantity used for the generation of an aerosol is supplied from the storage 116 to the retention unit 130 after the completion of generation of the aerosol. Thus, the occurrence of the temporary drying in the retention unit 130 can be effectively suppressed. In this example, the control unit 106 may control the notifier 108 in the first mode during an aerosol is generated, and may control the notifier 108 in the second mode different from the first mode, during the above-described interval. In this way, the user may refrain from inhalation, resulting that the time period for supplying the aerosol source from the storage 116 to the retention unit 130 can be ensured. Accordingly, the occurrence of the temporary drying or drying in the retention unit 130 can be suppressed. The control unit 106 may also control the notifier 108 in a third mode different from the second mode when the control unit 106 acquires the request from the requesting unit during the above-described interval. The control unit 106 may also control the circuit 134 to inhibit generation of an aerosol during the above-described interval. Accordingly, the quantity of the aerosol source retained by the retention unit 130 is hardly decreased during the above-described interval. As a result, the reoccurrence of the temporary drying in the retention unit 130 can be suppressed. The control unit 106 may also correct the length of the above-described interval based on at least one of the magnitude and change of the request from the requesting unit. Thus, since the length of the interval is corrected according to the inhalation pattern, the occurrence or reoccurrence of the temporary drying in the retention unit 130 can be suppressed by an appropriate inhalation interval.

Figure 15:
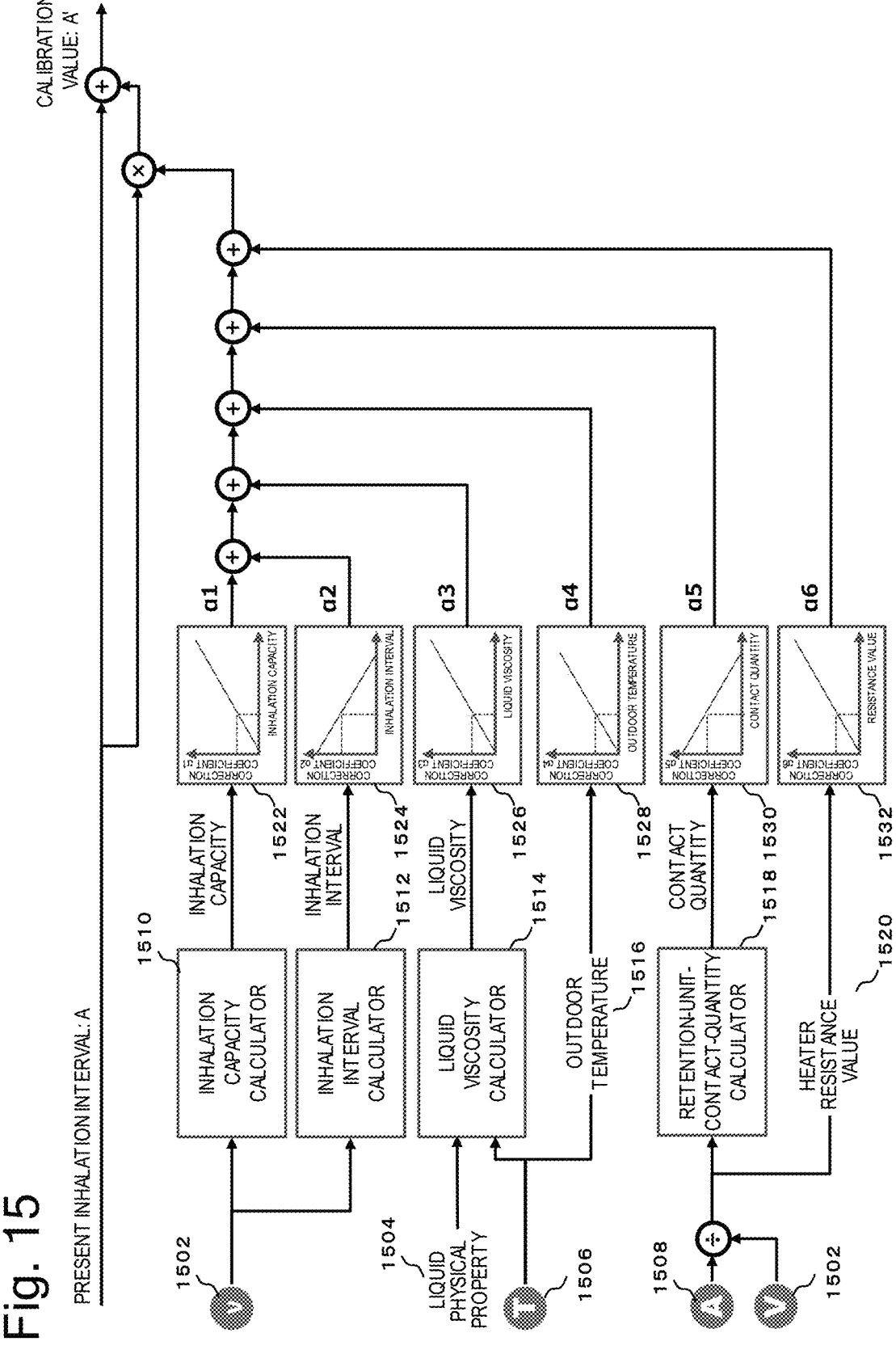
FIG. 15 is a chart illustrating a specific example of calibration of an inhalation interval which is performed in processing in FIG. 14.

FIG. 15 is a chart illustrating a specific example of calibration of an inhalation interval which is performed in the processing 1400 in FIG. 14. The control unit 106 can calibrate a present inhalation interval "A" using a correction coefficient obtained by various methods.

The control unit 106 may include a inhalation capacity calculator 1510, a inhalation interval calculator 1512, a liquid viscosity calculator 1514, and a retention-unit-contact-quantity calculator 1518, and may be configured to function as these components. The aerosol generating apparatus 100 may include at least one of a flow or flow rate sensor 1502, a temperature sensor 1506, a current sensor 1508, and a voltage sensor. The aerosol generating apparatus 100 may also include a unit for detecting liquid physical properties 1504 of the aerosol source.

As illustrated in FIG. 15, the inhalation capacity calculator 1510 calculates an inhalation capacity based on a flow or flow rate value detected by the flow or flow rate sensor 1502. The control unit 106 obtains a correction coefficient $\alpha 1$ from the calculated inhalation capacity based on a predefined relationship 1522 between the inhalation capacity and the correction coefficient $\alpha 1$.

The inhalation interval calculator 1512 calculates an inhalation interval based on a flow or flow rate value detected by the flow or flow rate sensor 1502. The control unit 106 obtains a correction coefficient $\alpha 2$ from the calculated inhalation capacity based on a predefined relationship 1524 between the inhalation interval and the correction coefficient $\alpha 2$.

The liquid viscosity calculator 1514 calculates a liquid viscosity based on the liquid physical properties of the aerosol source and a temperature detected by the temperature sensor 1506. The control unit 106 obtains a correction coefficient $\alpha 3$ from the calculated liquid viscosity based on a predefined relationship 1526 between the liquid viscosity and the correction coefficient $\alpha 3$.

The control unit 106 obtains a correction coefficient $\alpha 4$ from the detected outdoor temperature based on a predefined relationship 1528 between the correction coefficient $\alpha 4$ and the outdoor temperature 1516 detected by the temperature sensor 1506.

The retention-unit-contact-quantity calculator 1518 calculates a retention-unit contact quantity based on a current value detected by the current sensor 1508 and a voltage value detected by the voltage sensor. Note that the retention-unit contact quantity means a quantity representing how much the retention unit 130 contacts the aerosol source stored in the storage 116. According to this retention-unit contact quantity, the quantity of the aerosol source to be supplied from the storage 116 to the retention unit 130 changes by capillary effect. When the quantity of the aerosol source to be supplied to the retention unit 130 has changed, the temperature of the load 132 also changes. Therefore, the retention-unit contact quantity can be calculated from the resistance value of the load 132 that is calculated using the current sensor 1508 and the voltage sensor. The control unit 106 obtains a correction coefficient $\alpha 5$ from the calculated retention-unit contact quantity based on a predefined relationship 1530 between the retention-unit contact quantity and the correction coefficient $\alpha 5$.

The control unit 106 obtains a correction coefficient $\alpha 6$ based on a predefined relationship 1532 between the correction coefficient $\alpha 6$ and the heater resistance value 1520 calculated from the detected current value and voltage value.

The control unit 106 can apply the correction coefficients $\alpha 1$ to $\alpha 6$ obtained as described above to the present inhalation interval A in various methods. For example, the control unit 106 may obtain an inhalation interval A' configured by using, as the overall correction coefficient, a value obtained by multiplying, by A, a value obtained by adding the correction coefficients $\alpha 1$ to $\alpha 6$.

These are merely examples of methods of calculating the correction coefficient, and various methods can be applied. It should be understood by a person skilled in the art that the aerosol generating apparatus 100 may be configured differently to specifically implement processing schematically illustrated in FIG. 15.

In the above description, the second embodiment of the present disclosure has been described as an aerosol generating apparatus and a method of actuating the aerosol generating apparatus. However, it will be appreciated that the present disclosure, when being executed by a processor, can be implemented as a program that causes the processor to perform the method or as a computer readable storage medium storing the program.

Third Embodiment

As described in relation to the first embodiment of the present disclosure, there can be provided the aerosol generating apparatus capable of distinguishing between the first state in which the aerosol source stored in the storage is insufficient in quantity, and the second state in which the storage is capable of supplying the aerosol source while the aerosol source retained by the retention unit is insufficient in quantity. A third embodiment of the present disclosure which will be described below allows for appropriate control of the aerosol generating apparatus having such features.

The configuration (for example, a configuration described in connection with each of FIG. 1A, FIG. 1B, FIG. 2, FIG. 3, and FIG. 8) and the operation method (for example, the processing described in connection with each of FIG. 6, FIG. 7, FIG. 10, FIG. 12B, and FIG. 13B) of the aerosol generating apparatus described in relation to the first embodiment of the present disclosure, and the operation method (for example, the processing described in connection with each of FIG. 14 and FIG. 15) of the aerosol generating apparatus described in relation to the second embodiment of the present disclosure can be used as examples of the present embodiment.

In an example, an aerosol generating apparatus 100 according to the embodiment of the present disclosure includes: a power supply 110; a load 132 configured to generate heat upon receipt of electric power from the power supply 110 and atomize an aerosol source; an element 112 that is used to acquire a value related to a temperature of the load 132; a circuit 134 configured to electrically connect the power supply 110 and the load 132; a storage 116 configured to store the aerosol source; a retention unit 130 configured to retain an aerosol source supplied from the storage 116 to allow the retained aerosol source to be in a feasible state of being heated by the load 132, and a control unit 106. The control unit 106 may be configured to distinguish between the first state of the aerosol generating apparatus 100 in which the aerosol source stored in the storage 116 is insufficient in quantity, and the second state of the aerosol generating apparatus in which the storage 116 is capable of supplying the aerosol source while the aerosol source retained by the retention unit 130 is insufficient in quantity, on the basis of a change in a value related to the temperature of the load 132 after functioning of the circuit 134 or during functioning of the circuit 134, and configured to perform a first control upon detection of the first state, and perform a second control different from the first control upon detection of the second state. As a result, since the control to be performed when the insufficiency of the aerosol source in the storage 116 has been detected and the control to be performed when the insufficiency of the aerosol source in the retention unit 130 has been detected are different from each other, it is possible to perform an appropriate control according to an event that occur in the aerosol generating apparatus 100.

In an example, in the first state, the aerosol source stored in the storage 116 is insufficient in quantity and therefore the temperature of the load 132 exceeds a boiling point of the aerosol source or a temperature at which generation of an aerosol occurs by evaporation of the aerosol source. In the second state, the storage 116 is capable of supplying the aerosol source while the aerosol source retained by the retention unit 130 is insufficient in quantity, and therefore the temperature of the load 132 exceeds a boiling point of the aerosol source or a temperature at which generation of an aerosol occurs by evaporation of the aerosol source.

In an example, in the above-described second control, the quantity of the aerosol source stored in the storage 116 decreases larger than in the above-described first control. In this manner, the aerosol residual quantity in the storage 116 and the aerosol residual quantity in the retention unit 130 can be maintained at appropriate values according to the event.

In an example, in the control to be performed by the control unit 106 in the second control, a larger number of variables and/or a larger number of algorithms are changed, as compared with those in the control to be performed by the control unit 106 in the first control. The first control is performed when the first state (the state in which the aerosol source stored in the storage 116 is insufficient in quantity) has been detected. Accordingly, the first control may include only an indication to the user to replace the storage 116 or replenish an aerosol. On the other hand, the second control is performed when the second state (the state in which the storage 116 is capable of supplying the aerosol source while the aerosol source retained by the retention unit 130 is insufficient in quantity) has been detected. Accordingly, the second control may include various controls that may be included the process in step 1414 in FIG. 14 described in relation to the second embodiment of the present disclosure, for example. For example, the second control may include the control to increase a retaining quantity of the aerosol source in the retention unit 130 or the control to improve the possibility of increasing the retaining quantity, at at least one of a time of starting the power supply from the power supply 110 to the load 132 and a time of completing the power supply from the power supply 110 to the load 132. The second control may also include the control performed to make the interval from the completion of generation of an aerosol to the start of subsequent generation of an aerosol, longer than the previous interval. The length of the interval may be corrected based on at least one of the viscosity of the aerosol source, the residual quantity of the aerosol source, the electric resistance value of the load 132, and the temperature of the power supply 110. The second control may also include the control to increase at least one of the quantity and rate of the aerosol source to be supplied from the storage 116 to the retention unit 130. The second control may also include controlling the circuit 134 to decrease the quantity of the generated aerosol. The second control may also include controlling the temperature adjuster to heat the aerosol source. The second control may also include controlling the temperature adjuster to heat the aerosol source during an aerosol is not generated by the load 132. The second control may also include controlling the above-described changing unit to increase an air-flow resistance in the aerosol generating apparatus 100. The second control may also include controlling the circuit 134 in accordance with the correlation in which as the request issued from the requesting unit becomes larger, the quantity of the generated aerosol is increased. The second control may also include correcting the correlation to reduce the quantity of the generated aerosol corresponding to the magnitude of the request. In the present embodiment, it will be appreciated that as compared with the first control, it is necessary to change a larger number of variables and/or a larger number of algorithms to perform the second control.

In an example, the number of operations required for the user to allow for generation of an aerosol in the second control is smaller than the number of operations required for the user to allow for generation of an aerosol in the first control. For example, in the case of the first control, the user needs to perform an operation of replacing the storage 116, an operation of replenishing the aerosol source in the storage 116, and the like. On the other hand, the second control may include various controls described above, but these controls can be automatically performed by the components such as the control unit 106 in the aerosol generating apparatus 100 without requiring the user to perform the operations. From at least those matters, it will be appreciated that in the present embodiment, the number of operations required for the user to allow for generation of the aerosol in the second control may be smaller than the number of operations required for the user to allow for generation of the aerosol in the first control.

In an example, the control unit 106 may prohibit generation of an aerosol for at least a predetermined time period, in the first control and the second control. In this manner, in both cases of the first state and the second state, the aerosol generating apparatus 100 can lead to disablement, so that the temperature of the load 132 can be prevented from further increasing. The disablement means that the electric power is not supplied to the load 132 even when the user operates the aerosol generating apparatus 100.

A time period during which generation of an aerosol is inhibited in the second control may be shorter than the time period during which generation of an aerosol is inhibited in the first control. To return from the first state to the state capable of performing the normal control, an operation of replacing the storage 116 or the like is necessary. To return from second state to the state capable of performing the normal control, such an operation is unnecessary. Accordingly, the disablement control can be prevented from being unnecessarily performed for a long time period.

In an example, the first control and the second control have the return conditions respectively each for a shift from the state in which generation of an aerosol is inhibited to the state in which generation of an aerosol is allowed. The return means that the user operates the aerosol generating apparatus 100 to return to the state in which the electric power can be supplied to the load 132. The return condition in the first control may be set to become stricter than the return condition in the second control. For example, the return condition in the first control includes a larger number of conditions to be satisfied, as compared with the return condition in the second control. In another example, the return condition in the first control is more man-hours of the operations required for the user to perform, as compared with the return condition in the second control. In another example, the return condition in the first control is more time consuming to perform, as compared with the return condition in the second control. In another example, the return condition in the first control is not satisfied only by the control of the control unit 106, and manual operations of the user are also required to satisfy the return condition in the first control, whereas the return condition in the second control is satisfied only by the control of the control unit 106.

In another example, even when the return condition in the second control is satisfied, the return condition in the first control is not satisfied. The number of replacement operations of the component in the aerosol generating apparatus 100, which is included in the return condition in the first control, may be larger than the number of replacement operations of the component in the aerosol generating apparatus 100 that is included in the return condition in the second control.

As an example, the aerosol generating apparatus 100 may include one or more notifiers 108. The number of notifiers 108 functioning in the first control may be larger than the number of notifiers 108 functioning in the second control. This allows the user to easily recognize the insufficiency of the aerosol source when the user's operations are required to restore to the normal state. As a result, early return becomes possible. In another example, the time period during which the notifier 108 is functioning in the first control may be longer than the time period during which the notifier 108 is functioning in the second control. As another example, the amount of electric power to be supplied from the power supply 110 to the notifier 108 in the first control may be larger than the amount of electric power to be supplied from the power supply 110 to the notifier in the second control.

In the above description, the third embodiment of the present disclosure has been described as an aerosol generating apparatus and a method of actuating the aerosol generating apparatus. However, it will be appreciated that the present disclosure, when executed by a processor, can be implemented as a program that causes the processor to perform the method or as a computer readable storage medium storing the program.

The embodiments of the present disclosure have been described thus far, and it should be understood that these embodiments are only examples, and do not limit the scope of the present disclosure. It should be understood that modification, addition, alteration and the like of the embodiments can be properly performed without departing from the gist and scope of the present disclosure. The scope of the present disclosure should not be limited by any of the aforementioned embodiments, but should be specified by only the claims and the equivalents of the claims.

REFERENCE SIGNS LIST 100A, 100B aerosol generating apparatus; 102 first member; 104 second member; 106 control unit; 108 notifier; 110 power supply; 112 element; 114 memory; 116 storage; 118 atomizer; 120 air intake channel; 121 aerosol flow path; 122 mouthpiece; 126 third member; 128 flavor source; 130 retention unit; 132 load; 134 circuit; 202, 302 first path; 204, 304 second path; 206, 210 switch; 208, 308, 808 constant voltage output circuit; 212, 222, 312, 812, 822 resistor; 214, 226, 314, 322, 814, 826 capacitor; 218, 818 error amplifier; 220, 820 reference voltage source; 318 inductor; 320 diode; 802 single path; 1502 voltage sensor; 1504 liquid physical property; 1506 temperature sensor; 1508 current sensor; 1510 inhalation capacity calculator; 1512 inhalation interval calculator; 1514 liquid viscosity calculator; 1516 outdoor temperature; 1518 retention-unit-contact-quantity calculator; and 1520 heater resistance value.

The invention claimed is:
1. An aerosol generating apparatus, comprising:
a power supply;
a load configured to generate heat upon receipt of electric power from the power supply and atomize an aerosol source;

a sensor that is used to acquire a value related to a temperature of the load;

a circuit configured to electrically connect the power supply and the load, wherein the circuit includes a first path and a second path including the sensor, and the first path and the second path are connected in parallel to the power supply;

a container configured to store the aerosol source;

a fibrous or porous material configured to retain the aerosol source supplied from the container to allow the retained aerosol source to be in a state of being heated by the load; and a controller configured to distinguish between a first state of the aerosol generating apparatus in which the aerosol source stored in the container is insufficient in quantity, and a second state of the aerosol generating apparatus in which the container is capable of supplying the aerosol source while the aerosol source retained by the fibrous or porous material is insufficient in quantity, on a basis of a change in the value related to the temperature of the load, wherein the value is acquired by switching from a state in which the first path functions to a state in which the second path functions only after a user's inhalation has not been detected;

perform first control upon detection of the first state; and perform second control different from the first control upon detection of the second state, wherein the second control includes:

controlling a temperature adjuster such that the aerosol source is heated while an aerosol is not generated by the load, wherein the temperature adjuster is configured to adjust a temperature of the aerosol source, and wherein the temperature adjuster is the load or another component included in the aerosol generating apparatus, and maintaining the temperature of the aerosol source below a boiling point of the aerosol source.

2. The aerosol generating apparatus of claim 1, wherein due to the first state in which the aerosol source stored in the container is insufficient in quantity, or to the second state in which the container is capable of supplying the aerosol source while the aerosol source retained by the fibrous or porous material is insufficient in quantity, the temperature of the load exceeds a boiling point of the aerosol source.

3. The aerosol generating apparatus of claim 1, wherein in the second control, a quantity of the aerosol source stored in the container decreases larger than in the first control.

4. The aerosol generating apparatus of claim 1, wherein a number of operations required for the user to allow for generation of an aerosol in the second control is smaller than a number of operations required for the user to allow for generation of an aerosol in the first control.

5. The aerosol generating apparatus of claim 1, wherein the controller is configured to prohibit generation of an aerosol for at least a predetermined time period, in the first control and the second control.

6. The aerosol generating apparatus of claim 5, wherein a time period during which generation of an aerosol is inhibited in the second control is shorter than the time period during which generation of an aerosol is inhibited in the first control.

7. The aerosol generating apparatus of claim 5, wherein the first control and the second control have return conditions respectively each for a shift from a state in which generation of an aerosol is inhibited to a state in which generation of an aerosol is allowed; and satisfying the return condition in the first control requires more time or an additional operation compared to satisfying the return condition in the second control.

8. The aerosol generating apparatus of claim 7, wherein a number of replacement operations of a component in the aerosol generating apparatus, which is included in the return condition in the first control, is larger than a number of replacement operations of the component in the aerosol generating apparatus which is included in the return condition in the second control.

9. The aerosol generating apparatus of claim 1, further comprising:

a user interface including one or more outputs configured to output a notification to a user, wherein a number of the one or more outputs functioning in the first control is larger than a number of the one or more outputs functioning in the second control.

10. The aerosol generating apparatus of claim 1, further comprising:

a user interface including one or more outputs configured to output a notification to a user, wherein a time period during which the one or more outputs function in the first control is longer than a time period during which the one or more outputs function in the second control.

11. The aerosol generating apparatus of claim 1, further comprising:

a user interface including one or more outputs configured to output a notification to a user, wherein an amount of electric power to be supplied from the power supply to the one or more outputs in the first control is larger than an amount of electric power to be supplied from the power supply to the one or more outputs in the second control.

12. The aerosol generating apparatus of claim 1, wherein the second control includes a control to increase a retaining quantity of the aerosol source;

a control to improve a possibility of increasing the retaining quantity, at at least one of a time of starting the power supply from the power supply to the load and a time of completing the power supply from the power supply to the load;

a control performed to make an interval from completion of generation of an aerosol to the start of subsequent generation of an aerosol longer than a previous interval;

a control to increase at least one of a quantity and rate of the aerosol source to be supplied from the container to the fibrous or porous material configured to retain the aerosol source;

a control to decrease a quantity of the generated aerosol; and a control to increase an air-flow resistance in the aerosol generating apparatus.

13. The aerosol generating apparatus of claim 1, wherein in a control to be performed by the controller in the second control, a larger number of variables and/or a larger number of algorithms are changed, than in a control to be performed by the controller in the first control.

14. A method of actuating an aerosol generating apparatus including a power supply, a load and a circuit configured to electrically connect the power supply and the load, wherein the circuit includes a first path and a second path including a sensor that is used to acquire a value related to a temperature of the load, and wherein the first path and the second path are connected in parallel to the power supply, the method comprising:

heating the load to atomize an aerosol source;

distinguishing between a first state of the aerosol generating apparatus in which the aerosol source stored is insufficient in quantity, and a second state of the aerosol generating apparatus in which the aerosol source stored is not insufficient in quantity while the aerosol source retained in a state of being heated by the load is insufficient in quantity, on a basis of a change in a value related to a temperature of the load, wherein the value is acquired by switching from a state in which the first path functions to a state in which the second path functions only after a user's inhalation has not been detected; and performing a first control upon detection of the first state, and performing a second control, which is different from the first control, upon detection of the second state;

wherein the second control includes:

controlling a temperature adjuster such that the aerosol source is heated while an aerosol is not generated by the load, wherein the temperature adjuster is configured to adjust a temperature of the aerosol source, and wherein the temperature adjuster is the load or another component included in the aerosol generating apparatus, and maintaining the temperature of the aerosol source below a boiling point of the aerosol source.

15. The method of claim 14, wherein due to the first state in which the aerosol source stored in a container is insufficient in quantity, or to the second state in which the container is capable of supplying the aerosol source while the aerosol source retained by a fibrous or porous material is insufficient in quantity, the temperature of the load exceeds a boiling point of the aerosol source.

16. The method of claim 14, wherein the second control includes increasing a retaining quantity of the aerosol source;

improving a possibility of increasing the retaining quantity, at at least one of a time of starting the power supply from the power supply to the load and a time of completing the power supply from the power supply to the load;

making an interval from completion of generation of an aerosol to the start of subsequent generation of an aerosol longer than a previous interval;

increasing at least one of a quantity and rate of the aerosol source to be supplied from the container to the fibrous or porous material configured to retain the aerosol source;

decreasing a quantity of the generated aerosol; and increasing an air-flow resistance in the aerosol generating apparatus.

17. A non-transitory computer-readable medium including computer-program instructions for actuating an aerosol generating apparatus comprising a power supply, a load and a circuit configured to electrically connect the power supply and the load, wherein the circuit includes a first path and a second path including a sensor that is used to acquire a value related to a temperature of the load, and wherein the first path and the second path are connected in parallel to the power supply, wherein the computer-program instructions, when executed by the aerosol generating apparatus, cause the aerosol generating apparatus to:

heat the load to atomize an aerosol source;

distinguish between a first state of the aerosol generating apparatus in which the aerosol source stored is insufficient in quantity, and a second state of the aerosol generating apparatus in which the aerosol source stored is not insufficient in quantity while the aerosol source retained in a state of being heated by the load is insufficient in quantity, on a basis of a change in a value related to a temperature of the load, wherein the value is acquired by switching from a state in which the first path functions to a state in which the second path functions only after a user's inhalation has not been detected; and perform a first control upon detection of the first state, and perform a second control, which is different from the first control, upon detection of the second state;

wherein the second control includes:

controlling a temperature adjuster such that the aerosol source is heated while an aerosol is not generated by the load, wherein the temperature adjuster is configured to adjust a temperature of the aerosol source, and wherein the temperature adjuster is the load or another component included in the aerosol generating apparatus, and maintaining the temperature of the aerosol source below a boiling point of the aerosol source.

18. The non-transitory computer-readable medium of claim 17, wherein due to the first state in which the aerosol source stored in the container is insufficient in quantity, or to the second state in which the container is capable of supplying the aerosol source while the aerosol source retained by a fibrous or porous material is insufficient in quantity, the temperature of the load exceeds a boiling point of the aerosol source.

19. The non-transitory computer-readable medium of claim 17, wherein the second control includes increasing a retaining quantity of the aerosol source;

improving a possibility of increasing the retaining quantity, at at least one of a time of starting the power supply from the power supply to the load and a time of completing the power supply from the power supply to the load;

making an interval from completion of generation of an aerosol to the start of subsequent generation of an aerosol longer than a previous interval;

increasing at least one of a quantity and rate of the aerosol source to be supplied from the container to the fibrous or porous material configured to retain the aerosol source;

decreasing a quantity of the generated aerosol; and increasing an air-flow resistance in the aerosol generating apparatus.

* * * * *